United States Patent
Fang et al.

(10) Patent No.: US 10,674,353 B2
(45) Date of Patent: Jun. 2, 2020

(54) ASSOCIATION ESTABLISHMENT METHOD IN WIRELESS LOCAL AREA NETWORK, TERMINAL, AND ACCESS POINT

(71) Applicant: Huawei Technologies Co., Ltd., Shenzhen (CN)

(72) Inventors: Ping Fang, Shenzhen (CN); Yunsong Yang, San Diego, CA (US); Gaokun Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/328,842

(22) PCT Filed: Jul. 25, 2017

(86) PCT No.: PCT/CN2017/094374
§ 371 (c)(1),
(2) Date: Feb. 27, 2019

(87) PCT Pub. No.: WO2018/040805
PCT Pub. Date: Mar. 8, 2018

(65) Prior Publication Data
US 2019/0191301 A1  Jun. 20, 2019

(30) Foreign Application Priority Data

Aug. 31, 2016 (CN) .......................... 2016 1 0799549
Nov. 11, 2016 (CN) .......................... 2016 1 0995436

(51) Int. Cl.
*H04M 1/66* (2006.01)
*H04M 1/68* (2006.01)
(Continued)

(52) U.S. Cl.
CPC ............... *H04W 12/02* (2013.01); *H04L 9/30* (2013.01); *H04L 63/0428* (2013.01);
(Continued)

(58) Field of Classification Search
CPC . H04W 12/02; H04W 12/0401; H04W 48/08; H04L 9/30; H04L 63/0428
(Continued)

(56) References Cited

U.S. PATENT DOCUMENTS 9,197,676 B2 * 11/2015 Buckley .............. H04L 65/1016
10,250,698 B2 * 4/2019 Yang ....................... H04L 67/16
(Continued)

FOREIGN PATENT DOCUMENTS

CN          103476030 A     12/2013
CN          103596179 A      2/2014
(Continued)

*Primary Examiner* — Marceau Milord
(74) *Attorney, Agent, or Firm* — Slater Matsil, LLP

(57) ABSTRACT

A terminal, including a processor and a non-transitory computer-readable storage medium storing a program to be executed by the processor. The program includes instructions to generate encrypted capability information of the terminal, receive pre-association index information that is related to the terminal and that is sent by an access point, where the pre-association index information is used by the access point to identify the terminal when no association has been established between the terminal and the access point, send the encrypted capability information of the terminal and an association request message to the access point, where the association request message comprises the pre-association index information, and receive an association response message that is sent by the access point according to capability information of the terminal and the pre-association index information, so that the terminal establishes an association with the access point.

20 Claims, 11 Drawing Sheets

(51) Int. Cl.
*H04M 3/16* (2006.01)
*H04W 12/02* (2009.01)
*H04W 48/08* (2009.01)
*H04L 29/06* (2006.01)
*H04W 12/06* (2009.01)
*H04W 12/04* (2009.01)
*H04L 9/30* (2006.01)
*H04W 84/12* (2009.01)
*H04W 48/14* (2009.01)

(52) U.S. Cl.
CPC ..... *H04L 63/1466* (2013.01); *H04W 12/0401* (2019.01); *H04W 12/06* (2013.01); *H04W 48/08* (2013.01); *H04W 48/14* (2013.01); *H04W 84/12* (2013.01)

(58) Field of Classification Search
USPC ........................................ 455/411, 410, 414.1
See application file for complete search history.

(56) References Cited

U.S. PATENT DOCUMENTS

| | | | |
|---|---|---|---|
| 2006/0274643 A1 | 12/2006 | Choyi et al. | |
| 2009/0041247 A1* | 2/2009 | Barany | H04L 63/06 380/270 |
| 2013/0219180 A1* | 8/2013 | Saino | G06F 21/42 713/171 |
| 2014/0006538 A1* | 1/2014 | Oikonomou | H04L 67/28 709/213 |
| 2014/0254569 A1* | 9/2014 | Abraham | H04L 5/0092 370/336 |
| 2015/0094039 A1* | 4/2015 | Jung | H04M 3/42102 455/414.1 |
| 2015/0351084 A1* | 12/2015 | Werb | H04W 4/70 370/329 |
| 2016/0019475 A1 | 1/2016 | Bryksa et al. | |
| 2016/0057237 A1* | 2/2016 | Yang | H04L 67/16 709/224 |
| 2016/0127996 A1* | 5/2016 | Patil | H04W 48/16 370/311 |
| 2016/0135041 A1 | 5/2016 | Lee et al. | |
| 2017/0012977 A1 | 1/2017 | Li et al. | |
| 2017/0034847 A1* | 2/2017 | He | H04W 74/06 |
| 2017/0270528 A1* | 9/2017 | Prakash | G06Q 20/3224 |
| 2017/0339163 A1* | 11/2017 | Alhothaily | H04L 63/108 |

FOREIGN PATENT DOCUMENTS

| | | |
|---|---|---|
| CN | 104955038 A | 9/2015 |
| CN | 105577365 A | 5/2016 |
| CN | 105764045 A | 7/2016 |
| WO | 2007086705 A1 | 8/2007 |
| WO | 2014190243 A1 | 11/2014 |

* cited by examiner

ASSOCIATION ESTABLISHMENT METHOD IN WIRELESS LOCAL AREA NETWORK, TERMINAL, AND ACCESS POINT

CROSS-REFERENCE TO RELATED APPLICATIONS

This application is a national stage of International Application No. PCT/CN2017/094374, filed on Jul. 25, 2017, which claims priority to Chinese Patent Application No. 201610799549.0, filed on Aug. 31, 2016 and Chinese Patent Application No. 201610995436.8, Nov. 11, 2016. All of the aforementioned applications are hereby incorporated by reference in their entireties.

TECHNICAL FIELD

Embodiments of the present invention relate to the communications field, and in particular, to an association establishment method in a wireless local area network, a terminal, and an access point in the communications field.

BACKGROUND

As a short-range wireless local area network communications technology, a Wireless Fidelity (WiFi) technology is widely used because of its advantages such as a free spectrum and a high transmission rate. At present, WiFi access points (AP) are disposed in many public places such as airports, restaurants, and conference rooms. A user can connect a terminal with a WiFi network interface to an AP for low-cost or free network access.

Before sending an association request message to the AP, the terminal sends a probe request message to the AP. The probe request message carries device information of the terminal, for example, device capability information, supported rate information (Support rates), extended supported rate information (Extended Supported Rates), and vendor-specific information (Vendor Specific). These pieces of device information do not change in a normal case, that is, these pieces of device information that are carried in the probe request message that is sent before the terminal associates with the AP remain unchanged for a long time. Among these pieces of information, a single piece of information is not globally unique among different devices. However, a combination of one or more pieces of information in the information may become "fingerprint" information of a device. It is likely that the "fingerprint" information can uniquely identify the device to a great extent in a local area or even in an entire network. Therefore, an eavesdropper that receives the probe request message over an air interface and analyzes the "fingerprint" information message carried in the message is able to track the device and obtain privacy information of the user. For example, the eavesdropper obtains a frequently visited place and visiting time of the user, so as to obtain the privacy information, such as a life habit and a social relationship, of the user by analyzing a great amount of data.

SUMMARY

This application provides an association establishment method in a wireless local area network, a terminal, and an access point, so as to resolve a problem of user privacy leakage in an association process between a terminal and an access point.

According to a first aspect, an association establishment method in a wireless local area network is provided, where the method includes generating, by a terminal, encrypted capability information of the terminal, receiving, by the terminal, pre-association index information that is related to the terminal and that is sent by an access point, where the pre-association index information is used by the access point to identify the terminal when no association has been established between the terminal and the access point, sending, by the terminal, the encrypted capability information of the terminal and an association request message to the access point, where the association request message includes the pre-association index information, and receiving, by the terminal, an association response message that is sent by the access point according to capability information of the terminal and the pre-association index information, so that the terminal establishes an association with the access point.

The terminal can be identified by the pre-association index information. A time when no association has been established between the terminal and the access point may indicate a time when a current association has not been successfully established between the terminal and the access point, may be before establishment of the current association or during establishment of the current association, and may specifically include a time when the STA sends the association request message to the AP or a time when the AP receives the association request message sent by the STA. Certainly, the pre-association index information may also be continued to be used after the current association is successfully established between the terminal and the access point, for example, to be used before or during next association establishment between the terminal and the access point next time.

The capability information of the terminal is sent to the access point in an encrypted manner and the terminal is identified by using the pre-association index information, so that an eavesdropper cannot obtain the capability information of the terminal even though the capability information of the terminal is detected by listening over an air interface before or during association establishment. This can prevent the eavesdropper from determining a location, time, and other information of the terminal according to the capability information of the terminal, and avoid user privacy leakage.

With reference to the first aspect, in some implementations of the first aspect, the sending, by the terminal, the encrypted capacity information of the terminal and an association request message (which may be referred to as Association Request message) to the access point includes sending, by the terminal, the association request message to the access point, where the association request message includes the encrypted capability information of the terminal.

Carrying the encrypted capability information of the terminal by using the association request message can further reduce signaling overheads and improve utilization of radio resources.

With reference to the first aspect, in some implementations of the first aspect, the sending, by the terminal, the encrypted capability information of the terminal and an association request message to the access point includes sending, by the terminal, a first message to the access point, where the first message includes the encrypted capability information of the terminal, and the first message is a management message, and sending, by the terminal, the association request message to the access point.

With reference to the first aspect, in some implementations of the first aspect, before the sending, by the terminal, the encrypted capability information of the terminal to the access point, the method further includes sending, by the terminal, a public key of the terminal to the access point, where the public key of the terminal is used by the access point to generate a decryption key for decrypting the encrypted capability information of the terminal, and that the terminal receives the pre-association index information that is related to the terminal and that is sent by the access point occurs after the terminal sends the public key of the terminal to the access point, receiving, by the terminal, a public key that is of the access point and that is sent by the access point, and generating, by the terminal, an encryption key of the terminal according to the public key of the access point, where the encryption key of the terminal is used to encrypt the capability information of the terminal.

With reference to the first aspect, in some implementations of the first aspect, the sending, by the terminal, a public key of the terminal to the access point includes sending, by the terminal, a probe request message (namely, a Probe Request message) to the access point, where the probe request message includes the public key of the terminal, or sending, by the terminal, a second message to the access point, where the second message includes the public key of the terminal, and the second message is a management message.

With reference to the first aspect, in some implementations of the first aspect, the receiving, by the terminal, a public key that is of the access point and that is sent by the access point includes receiving, by the terminal, a probe response message sent by the access point, where the probe response message includes the public key of the access point, or receiving, by the terminal, a third message sent by the access point, where the third message includes the public key of the access point, and the third message is a management message, or receiving, by the terminal, a beacon frame sent by the access point, where the beacon frame includes the public key of the access point.

With reference to the first aspect, in some implementations of the first aspect, the method further includes receiving, by the terminal, indication information sent by the access point, where the indication information is used to indicate that the access point supports transmitting, with the terminal, encrypted device capability information of the terminal.

With reference to the first aspect, in some implementations of the first aspect, the method further includes the receiving, by the terminal, indication information sent by the access point includes receiving, by the terminal, the probe response message sent by the access point, where the probe response message includes the indication information, or receiving, by the terminal, a fourth message sent by the access point, where the fourth message includes the indication information, and the fourth message is a management message, or receiving, by the terminal, a beacon frame sent by the access point, where the beacon frame includes the indication information.

With reference to the first aspect, in some implementations of the first aspect, the receiving, by the terminal, pre-association index information sent by the access point includes receiving, by the terminal, a fifth message sent by the access point, where the fifth message includes the pre-association index information, and the fifth message is a management message (for example, an Action Frame), or receiving, by the terminal, the probe response message sent by the access point, where the probe response message includes the pre-association index information.

With reference to the first aspect, in some implementations of the first aspect, a media access control (MAC) address used by the terminal to send the association request message to the access point is different from a MAC address used by the terminal before the terminal sends the association request message to the access point.

Even if the MAC address used by the terminal before the terminal sends the association request message to the access point is different from the MAC address used to send the association request message, the access point can still identify the terminal by using the pre-association index information.

With reference to the first aspect, in some implementations of the first aspect, the first message and the second message are a same message, and the message includes both content included in the first message and content included in the second message.

With reference to the first aspect, in some implementations of the first aspect, the first message and the second message are independent messages.

It should be understood that the independent message herein may be a concept relative to the aforementioned same message, that is, the first message and the second message may be different messages that are separately sent.

With reference to the first aspect, in some implementations of the first aspect, the third message, the fourth message, and the fifth message are a same message, and the message includes content included in the third message, content included in the fourth message, and content included in the fifth message.

With reference to the first aspect, in some implementations of the first aspect, at least two messages of the third message, the fourth message, and the fifth message are independent messages.

It should be understood that the independent message herein may be a concept relative to the aforementioned same message, that is, the at least two messages of the third message, the fourth message, and the fifth message may be different messages that are separately sent.

According to a second aspect, an association establishment method in a wireless local area network is provided, where the method includes generating, by an access point, pre-association index information related to a terminal, where the pre-association index information is used by the access point to identify the terminal when no association has been established between the terminal and the access point, sending, by the access point, the pre-association index information to the terminal, receiving, by the access point, encrypted capability information of the terminal and an association request message that are sent by the terminal, where the association request message includes the pre-association index information, decrypting, by the access point, the encrypted capability information of the terminal, and sending, by the access point, an association response message to the terminal according to capability information of the terminal and the pre-association index information, so that the access point establishes an association with the terminal.

With reference to the second aspect, in some implementations of the second aspect, the receiving, by the access point, encrypted capability information of the terminal and an association request message that are sent by the terminal includes receiving, by the access point, the association request message sent by the terminal, where the association request message includes the encrypted capability information of the terminal.

With reference to the second aspect, in some implementations of the second aspect, the receiving, by the access point, encrypted capability information of the terminal and an association request message that are sent by the terminal includes receiving, by the access point, a first message sent by the terminal, where the first message includes the encrypted capability information of the terminal, and the first message is a management message, and receiving, by the access point, the association request message sent by the terminal.

With reference to the second aspect, in some implementations of the second aspect, before the receiving, by the access point, encrypted capability information that is of the terminal and that is sent by the terminal, the method further includes receiving, by the access point, a public key that is of the terminal and that is sent by the terminal, where that the access point sends the pre-association index information to the terminal occurs after the access point receives the public key that is of the terminal and that is sent by the terminal, generating, by the access point, a decryption key according to the public key of the terminal, where the decryption key is used for decrypting the encrypted capability information of the terminal, and sending, by the access point, a public key of the access point to the terminal, where the public key of the access point is used by the terminal to generate an encryption key for encrypting the capability information of the terminal.

With reference to the second aspect, in some implementations of the second aspect, the receiving, by the access point, a public key that is of the terminal and that is sent by the terminal includes receiving, by the access point, a probe request message sent by the terminal, where the probe request message includes the public key of the terminal, or receiving, by the access point, a second message sent by the terminal, where the second message includes the public key of the terminal, and the second message is a management message.

With reference to the second aspect, in some implementations of the second aspect, the sending, by the access point, a public key of the access point to the terminal includes sending, by the access point, a probe response message to the terminal, where the probe response message includes the public key of the access point, or sending, by the access point, a third message to the terminal, where the third message includes the public key of the access point, and the third message is a management message, or sending, by the access point, a beacon frame to the terminal, where the beacon frame includes the public key of the access point.

With reference to the second aspect, in some implementations of the second aspect, the method further includes sending, by the access point, indication information to the terminal, where the indication information is used to indicate that the access point supports transmitting, with the terminal, encrypted device capability information of the terminal.

With reference to the second aspect, in some implementations of the second aspect, the sending, by the access point, indication information to the terminal includes sending, by the access point, the probe response message to the terminal, where the probe response message includes the indication information, or sending, by the access point, a fourth message to the terminal, where the fourth message includes the indication information, and the fourth message is a management message, or sending, by the access point, a beacon frame to the terminal, where the beacon frame includes the indication information.

With reference to the second aspect, in some implementations of the second aspect, the sending, by the access point, the pre-association index information to the terminal includes sending, by the access point, a fifth message to the terminal, where the fifth message includes the pre-association index information, and the fifth message is a management message, or sending, by the access point, the probe response message to the terminal, where the probe response message includes the pre-association index information.

With reference to the second aspect, in some implementations of the second aspect, before the receiving the association request message sent by the terminal, the method further includes generating, by the access point, encrypted capability information of the access point, and sending, by the access point, the encrypted capability information of the access point to the terminal.

According to a third aspect, a terminal is provided, where the terminal may be configured to execute the method provided in the method embodiments of the first aspect, and the terminal includes a generation module, configured to generate encrypted capability information of the terminal, a receiving module, configured to receive pre-association index information sent by an access point, where the pre-association index information is used by the access point to identify the terminal, and a sending module, configured to send the encrypted capability information of the terminal and an association request message to the access point, where the association request message includes the pre-association index information. The receiving module is further configured to receive an association response message that is sent by the access point according to capability information of the terminal, so that the terminal establishes an association with the access point.

According to a fourth aspect, an access point is provided, where the access point may be configured to execute the method provided in the method embodiments of the second aspect, and the access point includes a generation module, configured to generate pre-association index information related to a terminal, where the pre-association index information is used by the access point to identify the terminal when no association has been established between the terminal and the access point, a sending module, configured to send the pre-association index information to the terminal, a receiving module, configured to receive encrypted capability information of the terminal and an association request message that are sent by the terminal, where the association request message includes the pre-association index information, and a decryption module, configured to decrypt the encrypted capability information of the terminal. The sending module is further configured to send an association response message to the terminal according to capability information of the terminal and the pre-association index information, so that the access point establishes an association with the terminal.

According to a fifth aspect, a terminal is provided, where the terminal may be configured to execute the method provided in the method embodiments of the first aspect, and the terminal includes a processor 1101, a memory 1102, a transmitter 1103, and a receiver 1105. The aforementioned components in the terminal are connected in a coupling manner, the receiver 1105 receives data by using an antenna 1104, and the transmitter 1103 sends data by using the antenna 1104. The processor 1101 is configured to generate encrypted capability information of the terminal. The receiver 1105 is configured to receive pre-association index information sent by an access point, where the pre-association index information is used by the access point to identify the terminal. The transmitter 1103 is configured to send the encrypted capability information of the terminal and an association request message to the access point, where the association request message includes the pre-association index information. The receiver 1104 is further configured to receive an association response message that is sent by the access point according to capability information of the terminal and the pre-association index information, so that the terminal establishes an association with the access point.

According to a sixth aspect, an access point is provided, where the access point may be configured to execute the method provided in method embodiments of the second aspect, and the access point includes a processor 1201, a memory 1202, a transmitter 1203, and a receiver 1205. The aforementioned components in the terminal are connected in a coupling manner. The receiver 1205 receives data by using an antenna 1204, and the transmitter 1203 sends data by using the antenna 1204. The processor 1201 is configured to generate pre-association index information related to a terminal, where the pre-association index information is used by the access point to identify the terminal when no association has been established between the terminal and the access point. The transmitter 1203 is configured to send the pre-association index information to the terminal. The receiver 1205 is configured to receive encrypted capability information of the terminal and an association request message that are sent by the terminal, where the association request message includes the pre-association index information. The processor 1201 is configured to decrypt the encrypted capability information of the terminal. The transmitter 1203 is further configured to send an association response message to the terminal according to capability information of the terminal and the pre-association index information, so that the access point establishes an association with the terminal.

According to a seventh aspect, a computer readable medium is provided, and is configured to store a computer program, where the computer program includes an instruction used to execute the method in the first aspect or any possible implementation of the first aspect.

According to an eighth aspect, a computer readable medium is provided, and is configured to store a computer program, where the computer program includes an instruction used to execute the method in the second aspect or any possible implementation of the second aspect.

According to a ninth aspect, a communications system is provided, including the terminal in the third aspect and the access point in the fourth aspect.

According to a tenth aspect, a communications system is provided, including the terminal in the fifth aspect and the access point in the sixth aspect.

The capability information of the terminal is sent to the access point in an encrypted manner, so that an eavesdropper cannot obtain the capability information of the terminal by means of decryption even though the encrypted capability information of the terminal is detected by listening over an air interface before or during association establishment. This can prevent the eavesdropper from determining a location, time, and other information of the terminal according to the capability information of the terminal, and avoid user privacy leakage. Further, the access point allocates the pre-association index information to the terminal, and identifies the terminal by using the pre-index association information. In this case, even if the MAC address used by the terminal before the terminal sends the association request message to the access point is different from the MAC address used for sending the association request message, the access point can still identify the terminal by using the pre-association index information and determine the decryption key to decrypt the encrypted device capability information of the terminal, so as to obtain the device capability information of the terminal.

DETAILED DESCRIPTION OF ILLUSTRATIVE EMBODIMENTS

The following describes the embodiments of the present invention with reference to accompanying drawings.

The embodiments of the present invention may be applied to various wireless communications systems, for example, a system based on Wireless Fidelity (WiFi), Bluetooth, Worldwide Interoperability for Microwave Access (WiMAX), wireless local area network authentication and privacy infrastructure (Wireless LAN Authentication and Privacy Infrastructure, WAPI), or the like, and another communications system in which terminals are connected to each other in a wireless manner. This is not limited in the embodiments of the present invention. However, for ease of description, the following embodiments are described by using a WiFi system as an example.

An access point (AP) may also be referred to as a wireless access point, a bridge, a hot spot, or the like, and may access a server or a communications network.

A station (STA) may be a wireless sensor, a wireless communications terminal, or a mobile terminal, such as a mobile phone (also referred to as a "cellular" phone) supporting a WiFi communication function and a computer with a wireless communication function. For example, the station may be a portable, pocket-sized, handheld, computer built-in, or in-vehicle wireless communications apparatus that supports a WiFi communication function, and the wireless communications apparatus exchanges voice and/or data with a radio access network. This is not limited in the embodiments of the present invention. However, for ease of description, the following embodiments are described by using a terminal as an example.

Figure 1:
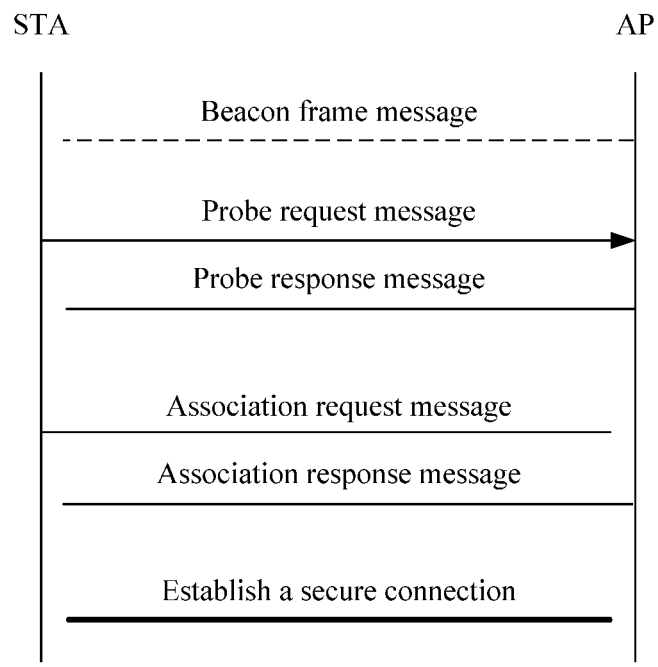
FIG. 1 is a possible application scenario according to an embodiment of the present invention.

FIG. 1 is a possible application scenario according to an embodiment of the present invention. As shown in FIG. 1, before sending an association request to an AP, a STA first sends a probe request message to the AP, where the probe request message may include device information of the STA, and receives a probe response message that is sent by the AP according to content of the probe request message. Alternatively, the terminal receives a beacon frame sent by the access point, where the beacon frame may include device information for the access point. Then, the terminal sends an association request message to the AP, and receives an association response message sent by the AP to complete an association with the AP. After being associated with the AP, the terminal may establish a secure connection with the AP by using a security authentication message, to implement subsequent data transmission.

In a process in which the STA establishes the association with the AP, the device information that is of the STA and that is carried in the probe request message and/or the association request message is sent by using an air interface. Because personalized information in the device information of the STA easily constitutes "fingerprint" information of the STA, an eavesdropper may receive, by using the air interface, and analyze the probe request message and/or the association request message packet, so that the STA can be tracked. This causes leakage of user privacy information.

It should be understood that, when a STA with a WiFi function has not been connected to an AP, the STA generally sends a probe request message periodically to scan a surrounding access point. Even if the STA has already been connected to a current AP, actually the STA still sends a probe request message to scan a surrounding access point, so that the STA can quickly complete access point handover when the current access point has a weak signal. Such a STA sends a probe request in both an associated state and an unassociated state, and the probe request carries device information, for example, personalized information such as device capability information and supported rate information, and MAC address information. All or part of the device information easily constitutes "fingerprint" information of the STA, and an eavesdropper can determine a location, time, and other information of the STA by listening to such information, so as to obtain user privacy information by means of analysis.

A problem of user privacy leakage caused by a MAC address of the STA can be resolved by using a temporary MAC address method. That is, the STA uses a temporary MAC address when the STA sends a probe request, and uses a real MAC address during an actual association with the AP. This method can prevent, to some extent, the eavesdropper from leaking the user privacy information by listening to a MAC address. However, the "fingerprint" information constituted by the device information included in the probe request message may still leak the user privacy information.

Figure 2:
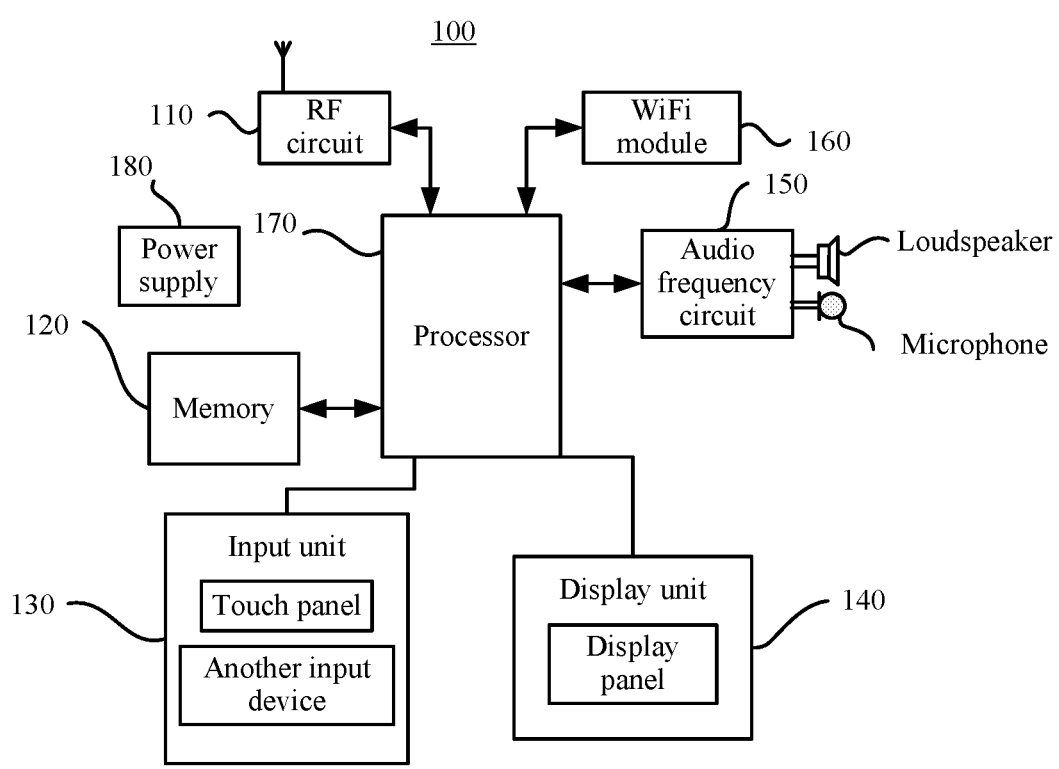
FIG. 2 is a schematic block diagram of a smartphone according to an embodiment of the present invention.

FIG. 2 shows a block diagram of a partial structure of a smartphone 100 related to an embodiment of the present invention. The smartphone 100 includes components such as a radio frequency (RF) circuit 110, a memory 120, an input unit 130, a display unit 140, an audio frequency circuit 150, a WiFi module 160, a processor 170, and a power supply 180. A person skilled in the art may understand that a mobile phone structure shown in FIG. 4 does not constitute any limitation on a mobile phone, and the mobile phone may include more or fewer components than those shown in the figure, or some components may be combined, or some components may be separated, or the components may be disposed in a different manner.

In this embodiment of the present invention, the RF circuit 110 may be configured to receive and send information, or receive and send a signal in a call process. In particular, the RF circuit 110 receives downlink information of a base station and sends the downlink information to the processor 170 for processing. In addition, the RF circuit 110 sends uplink data to the base station. Generally, the RF circuit 110 includes but is not limited to an antenna, at least one amplifier, a transceiver, a coupler, a low noise amplifier (LNA), a duplexer, and the like. In addition, the RF circuit 110 may communicate with a network and another device by means of wireless communication. For the wireless communication, any communications standard or protocol may be used, including but not limited to a Global System for Mobile Communications (GSM), General Packet Radio Service (GPRS), Code Division Multiple Access (CDMA), Wideband Code Division Multiple Access (WCDMA), Long Term Evolution (LTE), an email, a short message service (SMS), and the like.

The memory 120 may be configured to store a software program. The processor 170 executes various function applications and data processing of the smartphone 100 by running the software program stored in the memory 120. The memory 120 may mainly include a program storage area and a data storage area. The program storage area may store an operating system, an application program required by at least one function (for example, a sound playback function and an image playback function), and the like. The data storage area may store data (for example, audio data and a phone book) created according to use of the smartphone 100, and the like. In addition, the memory 120 may include a high-speed random access memory, and may further include a non-volatile memory, for example, at least one magnetic disk storage device, a flash memory device, or another volatile solid-state storage device.

The input unit 130 may be configured to receive entered digit or character information, and generate a key signal input related to user settings or function control of the smartphone 100. Specifically, the input unit 130 may include a touch panel and another input device. The touch panel, also referred to as a touchscreen, is capable of collecting a touch operation performed by a user on the touch panel or near the touch panel (for example, an operation performed by the user on the touch panel or near the touch panel by using any suitable object or accessory, such as a finger and a stylus), and driving a corresponding connection apparatus according to a preset program. Optionally, the touch panel may include two parts a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into contact coordinates, and sends the contact coordinates to the processor, and can receive a command sent by the processor and execute the command. In addition, the touch panel may be implemented in multiple types, such as a resistive type, a capacitive type, an infrared type, and a surface acoustic wave type. In addition to the touch panel, the input unit may further include the another input device. Specifically, the another input device may include but is not limited to one or more of a physical keyboard, a function key (for example, a volume control key or a switch key), a trackball, a mouse, or a joystick.

The display unit 140 may be configured to display information entered by the user, information provided for the user, and various menus of the device. The display unit 140 may include a display panel. Optionally, the display panel may be configured in a form of a liquid crystal display (LCD), an organic light-emitting diode (OLED), or the like. Further, the touch panel may cover the display panel. After detecting a touch operation on the touch panel or near the touch panel, the touch panel sends the touch operation to the processor to determine a type of a touch event. Then, the processor 170 provides a corresponding visual output on the display panel according to the type of the touch event. In FIG. 2, the touch panel and the display panel are used as two separate components to implement input and output functions of the smartphone 100, however, in some embodiments, the touch panel may be integrated with the display panel to implement the input and output functions of the smartphone 100.

The audio frequency circuit 150, a loudspeaker, and a microphone may provide an audio interface between the user and the smartphone 100. The audio frequency circuit 150 may convert received audio data into an electrical signal and transmit the electrical signal to the loudspeaker, and the loudspeaker converts the electrical signal into a sound signal for output. In addition, the microphone converts a collected sound signal into an electrical signal, and the audio frequency circuit 150 receives the electrical signal, converts the electrical signal into audio data, and then outputs the audio data to the memory 170 for further processing.

The WiFi module 160 is a set of basic chip circuits integrating a WiFi function. The WiFi module 160 is capable of performing wireless transmission according to a protocol.

The processor 170 is a control center of the smartphone 100, and is connected to various parts of the entire smartphone 100 by using various interfaces and lines, and executes various functions of the smartphone 100 and processes data by running or executing the software program and/or a module stored in the memory and invoking data stored in the memory 120, so as to perform overall monitoring on the smartphone 100. Optionally, the processor 170 may include one or more processing units. Optionally, an application processor and a modem processor may be integrated in the processor 170, where the application processor primarily processes an operating system, a user interface, an application program, and the like, and the modem processor primarily processes wireless communication. It can be understood that the modem processor may be alternatively not integrated in the processor 170.

It should be understood that the foregoing mobile phone including the WiFi module may be used as an access point or used as a terminal of an associated access point. Regardless of whether the mobile phone is used as an access point or a terminal of an associated access point, because the mobile phone includes a large amount of personal privacy information, the mobile phone, as the terminal associated with the access point or as the access point, has a privacy protection requirement.

It should also be understood that the mobile phone being used as the terminal associated with the access point may be an application scenario in this embodiment of the present invention. That is, the terminal described in this embodiment of the present invention may be the mobile phone described herein. For a structure of the mobile phone, reference may be made to the block diagram of the partial structure of the mobile phone (for example, a transmitter and a receiver of the terminal may be corresponding to the RF circuit of the mobile phone, and may perform similar or same functions), and more or fewer components may be included.

Figure 3:
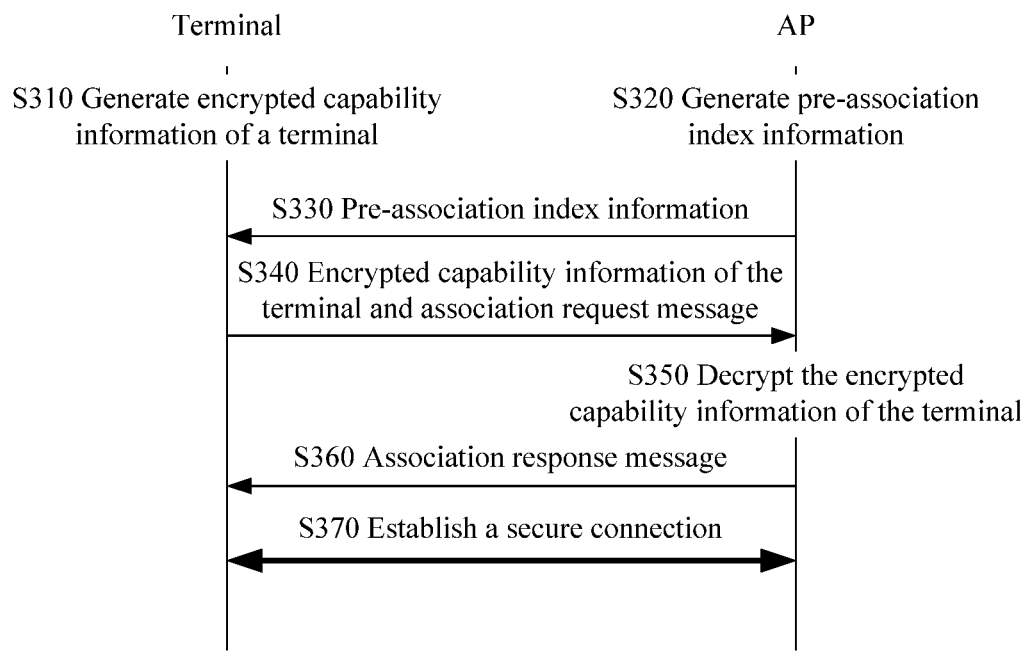
FIG. 3 is a flowchart of an association establishment method in a wireless local area network according to an embodiment of the present invention.

FIG. 3 shows a schematic diagram of an association establishment method in a wireless local area network according to an embodiment of the present invention. The method may be used in a scenario in which a wearable device is used as a STA and a mobile phone is used as an AP. It should be understood that the STA may also be referred to as a terminal in this embodiment of the present invention. The method includes the following steps.

S310. Generate encrypted capability information of the terminal.

Specifically, the terminal may encrypt personalized capability information of the terminal, to generate the encrypted capability information of the terminal. Herein, the personalized capability information of the terminal may be capability information specific to the terminal, that is, an eavesdropper may track the device according to "fingerprint" information formed by personalized information of the terminal. Certainly, the capability information of the terminal may include general capability information of the terminal, and these pieces of capability information of the terminal may be all or some of device information of the terminal. This is not limited in this embodiment of the present invention.

Optionally, in some embodiments, the AP may also generate encrypted capability information of the AP. It should be understood herein that the capability information of the AP may be all or some of device information of the AP. The AP may determine, according to a confidential transmission requirement, the capability information that is of the AP and that is to be encrypted for transmission.

Specifically, the terminal is associated with the AP, and the AP may also have a privacy protection requirement. When the AP requires privacy protection, the AP may also generate the encrypted capability information of the AP, where the capability information of the AP herein may be all or some of the device information of the AP.

S320. The access point generates pre-association index information related to the terminal, where the pre-association index information is used to identify the terminal when no association has been established between the terminal and the access point.

Specifically, the access point generates the pre-association index information, where the pre-association index information may be not changed for a period of time. Certainly, the AP may alternatively set a pre-association index to be unique for a long enough time. In this way, after the AP generates the pre-association index, a specific terminal can be identified for a very long time. Therefore, the capability information of the terminal corresponding to the pre-association index is determined according to the pre-association index information, and in a subsequent association process, it can be determined to use a capability corresponding to the terminal to establish an association. It should be understood that the pre-association index information may be further corresponding to one terminal, and the pre-association index information generated by the AP remains unique within a validity period of the index information, that is, each terminal is corresponding to different pre-association index information and the pre-association index information is in a one-to-one correspondence with the terminal. It should also be understood that the pre-association index information herein may be an identity (ID) identifier, or a string of digits, or a character, or a combination of a digit and a character. This is not limited in this embodiment of the present invention. The pre-association index information may be generated before the association, and the validity period may have different duration. For example, the pre-association index information may become invalid immediately after a current association between the STA and the AP is completed. Alternatively, the pre-association index information may remain effective for a long time, so that after a current association between the STA and the AP is completed, the pre-association index information still remains effective until a next association between the STA and the AP.

Optionally, in some embodiments, the AP generates the pre-association index information, where the pre-association index information may also identify the capability information of the terminal. For example, when the terminal has capability information 1, the AP generates pre-association index information 1 corresponding to the capability information 1, and when the terminal has capability information 2, the AP generates pre-association index information 2 corresponding to the capability information 2. In a subsequent actual association process between the AP and the terminal, the AP may determine the capability information of the terminal according to the pre-association index information, so as to use a corresponding capability to perform data transmission with the terminal. Herein, when the pre-association index information generated by the AP is corresponding to different device capability information, a same piece of pre-association index information may be corresponding to multiple terminals, that is, in a one-to-many correspondence. For example, all terminals having the capability information 1 may be corresponding to association information 1. When the pre-association index information is used to identify the capability information of the terminal, there are only several limited types of association index information. This avoids leakage of privacy information caused by a "fingerprint" that is formed by personalized device capability information of the terminal, and improves a terminal privacy protection capability.

Optionally, in some embodiments, the AP may also generate encrypted pre-association index information. When the AP generates the encrypted pre-association index information, the eavesdropper can be prevented from obtaining the pre-association index information by using an air interface, thereby better protecting user privacy.

In addition, a sequence of generating the encrypted capability information of the terminal in S310 and generating the pre-association index information in S320 is not limited in this embodiment. The terminal may first generate the encrypted capability information, or the AP may first generate the pre-association index information.

S330. The access point sends the pre-association index information to the terminal.

It should be understood that, in this embodiment of the present invention, the access point may also send the encrypted pre-association index information to the terminal. This is not limited in this embodiment of the present invention.

Optionally, in some embodiments, the access point may send a fifth message to the terminal, and the fifth message includes the pre-association index information.

Specifically, in this embodiment of the present invention, the fifth message may be a newly defined frame, for example, the fifth message may be a management frame, such as an Action frame or a Public Action frame. The Action frame carries the pre-association index information. It should be understood that, before the AP sends the pre-association index information to the terminal by using the fifth message, the access point may also receive an associated frame sent by the terminal. The associated frame may include the general capability information of the terminal. The associated frame herein may also be a newly defined management frame, for example, an Action frame. That is, when the terminal sends the general capability information of the terminal to the access point by using the newly defined management frame, the access point may send the pre-association index information to the terminal by using the newly defined fifth message.

It should also be understood that, when the terminal has a relatively high confidentiality capability requirement, the access point may also send the encrypted pre-association index information by using the fifth message.

Optionally, in some embodiments, the access point may send a probe response message to the terminal, where the probe response message includes the pre-association index information.

It should be understood that, before the access point sends the probe response message to the terminal, the method further includes sending, by the terminal, a probe request message to the access point.

Specifically, in this embodiment of the present invention, the terminal sends the probe request message to the AP, where the probe request message may include the general capability information of the terminal. It should be understood that the terminal may also determine, according to a privacy protection requirement of the terminal, the general capability information included in the probe request information. For example, when the terminal has a very high privacy protection requirement, all device capability information that may be used by the eavesdropper to generate a "fingerprint" is not transmitted. Certainly, the access point may also encrypt the pre-association index information, that is, the access point may send the encrypted pre-association index information to the terminal by using the probe response message. After the access point receives the probe request message of the terminal, the access point sends the probe response message of the probe request message to the terminal. The probe response message may include the pre-association index information generated by the AP.

It should be understood that, when the terminal transmits the general capability information by sending a newly defined management frame, the access point also sends a newly defined associated frame to the terminal, to transmit the pre-association index information. However, this embodiment of the present invention is not limited thereto. For example, the terminal may use the probe request message to carry the general capability information of the terminal, and the access point may send the pre-association index information to the terminal by using a newly defined frame, or the terminal may send the pre-association index information of the terminal to the access point by using a newly defined frame, and the access point may send the pre-association index information to the terminal by using the probe response message. Herein, the newly defined frame may be a management frame, such as an Action frame.

It should also be understood that a sequence of step S330 and S310 is not limited. It is acceptable as long as the AP transmits the pre-association index information before the terminal initiates an association request. The terminal adds the pre-association index information to the association request, so that the AP identifies a terminal corresponding to the association request.

S340. The terminal sends the encrypted capability information of the terminal and an association request message to the access point, where the association request message includes the pre-association index information.

It should be understood that, in this embodiment of the present invention, the encrypted capability information of the terminal and the association request message may be sent simultaneously or may be sent by using different messages. For example, the encrypted capability information of the terminal is first sent, and the association request message is then sent. That the terminal sends the encrypted capability information of the terminal to the access point may be implemented in multiple manners. Specific implementations may be described below.

Optionally, in some embodiments, that the terminal sends the encrypted capability information of the terminal and the association request message to the access point includes sending, by the terminal, the association request message to the access point, where the association request message includes the encrypted capability information of the terminal.

Specifically, the terminal may add an information element (IE) to the association request message sent to the AP, and the IE carries the encrypted capability information of the terminal. That is, a new information element (IE) is added to the association request message to carry the encrypted capability information of the terminal. In this case, the AP may determine the terminal according to the pre-association index information and determine a key previously negotiated with the terminal, so that the AP determines to decrypt the received encrypted capability information of the terminal by using the corresponding key.

Optionally, in some embodiments, that the terminal sends the encrypted capability information of the terminal and the association request message to the access point includes sending, by the terminal, a first message to the access point, where the first message includes the encrypted capability information of the terminal, and the first message is a management message, and sending, by the terminal, the association request message to the access point.

Specifically, the first message may be a newly defined frame, for example, the first message may be a management frame, such as an Action frame or a Public Action frame. The terminal may use the Action Frame to carry the encrypted capability information of the terminal. Certainly, the first message may alternatively be another type of frame. The terminal sends the association request message to the access point, where the association request message may carry the pre-association index information. Specifically, a new IE may be added to the association request message, and the IE carries the pre-association index information. The pre-association index information is generated and sent to the terminal by the AP, and the terminal may add the pre-association index information to the association request information, so that the AP can determine the terminal according to the pre-association index information. In this way, even if different MAC addresses are used for an association message and a message previously sent to the AP by the terminal, the AP can still determine a correspondence with the terminal according to the pre-association index information.

It should be understood that the terminal may send the first message to the access point before the terminal sends the association request message, that is, before the terminal sends the association request message to the AP, the AP may have obtained the capability information of the terminal. The AP may send the pre-association index information to the terminal before the terminal sends the first message or after the terminal sends the first message. This is not limited in this embodiment of the present invention. However, the AP needs to send the pre-association index information before the terminal sends the association request message. When the access point sends the pre-association index information to the terminal after the terminal sends the first message, the terminal sends the encrypted capability information of the terminal by using the first message. After receiving the capability information of the terminal, the AP sends allocated pre-association index information to the terminal. Subsequently, when the terminal sends the association request message to the access point, the pre-association index information that is previously allocated by the AP to the terminal is carried. In this way, even if no capability information of the terminal is carried in the association request message sent by the terminal, the AP can also determine the capability information of the terminal according to the pre-association index information carried in the association request message.

It should be understood that the AP allocates the pre-association index information to the terminal after receiving the encrypted capability information of the terminal. In this case, the pre-association index information allocated by the access point to the terminal can be used to identify the capability information of the terminal. For example, after the access point obtains the encrypted capability information of the terminal, the access point identifies the capability information 1 of the terminal by using the pre-association index information 1 and sends the pre-association index information 1 to the terminal. During a subsequent association of the terminal, the pre-association index information 1 is carried, and the access point may determine the capability information of the terminal by using the pre-association index information 1.

It should be understood that, in this embodiment of the present invention, the capability information of the terminal may be sent by using the first message and before the association request message, so that the capability information of the terminal may not be included in the association request message, or the association request message may include only the general capability information of the terminal, and the access point may determine a corresponding terminal by using the association request message.

Optionally, in some embodiments, that the terminal sends the encrypted capability information of the terminal to the access point includes sending, by the terminal, the probe request message to the access point, where the probe request message includes the encrypted capability information of the terminal.

Specifically, the terminal sends the probe request message to the access point. A new IE may be added to the probe request message, and the IE carries the encrypted capability information of the terminal. Certainly, the encrypted capability information of the terminal may alternatively be carried by using an existing IE in the probe request message.

Optionally, in some embodiments, a MAC address used by the terminal to send the association request message to the access point is different from a MAC address used by the terminal to send a message to the access point before the association request message.

It should be understood that, in this embodiment of the present invention, when the terminal performs an association with the AP, the terminal is in a scanning phase, that is, a MAC address used by the terminal to exchange signaling with the AP before the terminal sends an association request to the AP may be different from a MAC address used by the terminal to perform the association with the AP. Therefore, in this embodiment of the present invention, the AP may identify, by using the generated pre-association index information, the terminal and/or a capability of the terminal when the terminal actually performs the association with the AP. In this way, even if the MAC address for sending the association request by the terminal to the AP is changed, the AP can also determine, by using the pre-association index information, a terminal corresponding to the association request and determine corresponding capability information.

S350. The access point decrypts the encrypted capability information of the terminal.

Specifically, after receiving the encrypted capability information that is of the terminal and that is sent by the terminal, the access point decrypts the encrypted capability information of the terminal, to obtain the capability information of the terminal.

It should be understood that, when the terminal sends the encrypted capability information of the terminal by using the first message in S340, that the access point decrypts the encrypted capability information of the terminal in S350 may be before the terminal sends the association request message in S340 and after the terminal sends the first message.

It should also be understood that the access point may alternatively generate the pre-association index information after S350, that is, the access point may generate the pre-association index information according to the capability information of the terminal after obtaining the encrypted capability information of the terminal. Certainly, the access point may alternatively generate the pre-association index information before S350. This is not limited in this embodiment of the present invention.

S360. The access point sends an association response message to the terminal according to capability information of the terminal and the pre-association index information, so as to complete an association with the terminal.

In some embodiments, when the pre-association index information may also identify the capability information of the terminal, step S360 may be that the access point sends the association response message to the terminal according to the pre-association index information, to complete the association with the terminal.

S370. The access point establishes a secure connection to the terminal.

It should be noted that, when the terminal receives the association response message that carries indication information indicating a successful association, that is, the terminal completes the association with the AP, the terminal and the access point may then establish a connection for data transmission. Before the terminal sends the association request message, security authentication between the terminal and the AP may further be included, or after the terminal receives the association response message, the terminal and the access point perform security authentication before completing connection establishment.

It should be understood that sequence numbers of the foregoing processes do not mean an execution order in this implementation of the present invention. For example, that the access point sends the pre-association index information to the terminal in S330 is not necessarily after S310, and S330 may also be executed before S310. The execution order of the processes should be determined according to functions and internal logic of the processes, and should not constitute any limitation on an implementation process of this embodiment of the present invention.

The capability information of the terminal is sent to the access point in an encrypted manner, so that the eavesdropper cannot obtain the capability information of the terminal even though the capability information is detected by listening over an air interface before or during association establishment. This can prevent the eavesdropper from determining a location, time, and other information of the terminal according to the capability information of the terminal, and avoid user privacy leakage. Further, the access point allocates the pre-association index information to the terminal, and identifies the terminal by using the pre-index association information. In this case, even if the MAC address used by the terminal before the terminal sends the association request message to the access point is different from the MAC address used for sending the association request message, the access point can still identify the terminal by using the pre-association index information and determine a decryption key for encrypted device capability information of the terminal to decrypt the device capability information of the terminal, so as to obtain the device capability information of the terminal.

Optionally, in some embodiments, before the terminal sends the encrypted capability information of the terminal to the access point, the method further includes sending, by the terminal, the probe request message to the access point, and receiving, the terminal, the probe response message sent by the access point according to the probe request message.

Specifically, in this embodiment of the present invention, if the terminal sends the encrypted capability information of the terminal by using a newly defined frame, for example, a management frame, and the access point sends the association request message to the terminal by using a newly defined frame, when the terminal sends the probe request message to the access point, the probe request message may carry only the general capability information of the terminal. The general capability information may be used by the AP to determine whether to further perform a subsequent association with the terminal. Certainly, when sending the probe response message to the access point, the AP may also add general capability information of the AP to the probe response message. If privacy protection is not required for the AP, the AP may also add personalized capability information of the AP to the probe response message.

Optionally, in some embodiments, before the terminal sends the encrypted capability information of the terminal to the access point, the method further includes sending, by the terminal, a public key of the terminal to the access point, where the public key of the terminal is used by the access point to generate a decryption key for decrypting the encrypted capability information of the terminal, and that the terminal receives the pre-association index information that is related to the terminal and that is sent by the access point occurs after the terminal sends the public key of the terminal to the access point, receiving, by the terminal, a public key that is of the access point and that is sent by the access point, and generating, by the terminal, an encryption key of the terminal according to the public key of the access point, where the encryption key of the terminal is used to encrypt the capability information of the terminal.

Specifically, in this embodiment of the present invention, the terminal and the AP send respective public keys to each other, to implement public key exchange. The public key of the terminal is corresponding to a private key of the terminal. The public key of the access point is corresponding to a private key of the access point. It should be understood that the two actions of sending the public key to the access point by the terminal and sending the public key to the terminal by the access point may be not executed sequentially, provided that the public keys are exchanged by means of signaling interaction. The public key of the terminal herein may also be referred to as public key information of the terminal, and the public key of the AP may also be referred to as public key information of the AP. It should also be understood that key exchange between the terminal and the access point by using signaling may be implemented in multiple manners, and the following describes the key exchange between the terminal and the access point. It should be understood that merely several optional manners of this embodiment of the present invention are described below. However, this embodiment of the present invention is not limited thereto.

It should also be understood that, when the terminal first receives the public key sent by the access point, the terminal may generate the encryption key according to private key information of the terminal and the public key of the access point. The encryption key is used to encrypt the device capability information of terminal, so as to generate the encrypted device capability information. Certainly, when generating the encryption key herein, the terminal may also use other information, for example, location information of the access point or a random value Nonce. It should also be understood that, after generating the encrypted capability information according to the encryption key, the terminal may add the generated encrypted capability information of the terminal to a public key message sent to the access point. After receiving the public key that is of the terminal and that is sent by the terminal, the access point may generate the decryption key according to the public key information of the terminal and with reference to private key information of the access point, so as to decrypt the encrypted capability information of the terminal of the device and then obtain the device capability information of the terminal.

Optionally, in some embodiments, the sending, by the terminal, a public key of the terminal to the access point includes sending, by the terminal, the probe request message to the access point, where the probe request message includes the public key of the terminal, or sending, by the terminal, a second message to the access point, where the second message includes the public key of the terminal, and the second message is a management message.

Specifically, the terminal sends the probe request message to the access point, and the probe request message includes the public key of the terminal. The probe request message sent by the terminal to the access point may include a newly defined IE, and the IE carries the public key of the terminal. Certainly, the public key of the terminal may alternatively be carried by using an existing IE in the probe request message. It should be understood that the terminal may carry the public key of the terminal by using a unicast and/or multicast probe request message and/or second message, where multicast herein may include broadcast.

The terminal sends the second message to the access point, where the second message includes the public key of the terminal, and the second message is a management message. The second message may be a newly defined frame, for example, an Action frame or a Public action frame, and a key of the terminal is carried in the Action frame.

Optionally, in some embodiments, the receiving, by the terminal, a public key that is of the access point and that is sent by the access point includes receiving, by the terminal, the probe response message sent by the access point, where the probe response message includes the public key of the access point.

Specifically, in this embodiment of the present invention, after receiving the probe request message sent by the terminal, the access point sends the probe response message to the terminal according to the probe request message. An IE is newly defined in the probe response message to carry the public key of the access point. Certainly, the public key of the access point may alternatively be carried by using an existing IE in the probe response message.

Optionally, in some embodiments, the receiving, by the terminal, a public key that is of the access point and that is sent by the access point includes receiving, by the terminal, a third message sent by the access point, where the third message includes the public key of the access point, and the third message is a management message.

It should be understood that the third message may be a newly defined frame, for example, an Action frame or a Public action frame, and the public key of the access point is carried in the action frame.

Herein, the access point may use a unicast and/or multicast probe response message and/or third message to carry the public key of the access point, where multicast herein may include broadcast.

Optionally, in some embodiments, the receiving, by the terminal, a public key that is of the access point and that is sent by the access point includes receiving, by the terminal, a beacon frame sent by the access point, where the beacon frame includes the public key of the access point.

Specifically, in this embodiment of the present invention, the access point may define an IE in the beacon frame sent to the terminal, and the newly defined IE may be used to carry the public key of the access point. Certainly, the public key of the access point may alternatively be carried by using an existing IE in the beacon frame.

It should be understood that sending the public key of the AP to the terminal by the AP may also be implemented synchronously with indicating by the AP to the terminal that the AP supports a security association mode. For example, the AP may add, to the probe response message, both the public key of the AP and indication information indicating that the access point supports the security association mode. Certainly, the AP may merely send the public key to the terminal to implicitly indicate that the AP supports the security association mode. It should also be understood that a key exchange process between the AP and the terminal may also be performed before a process of discovering a capability of the AP by the terminal or after the terminal discovers the capability of the AP. This is not limited in this embodiment of the present invention. Discovering the capability of the AP herein may refer to learning by the terminal that AP supports the security association mode.

Optionally, in some embodiments, the terminal and the AP may use a Diffie-Hellman (DH) key exchange algorithm to calculate and generate respective encryption keys. For example, after obtaining the public key AP-PK of the AP (corresponding to the private key AP-pk of the AP), the terminal may calculate the encryption key STA-dhk of the terminal by using the DH algorithm and the private key STA-pk of the terminal. Likewise, after obtaining the public key STA-PK of the terminal (corresponding to the private key STA-pk of the STA), the AP may also calculate the encryption key AP-dhk of the AP according to the DH algorithm and the private key AP-pk of the AP. The STA-dhk and the AP-dhk herein are same symmetric encryption keys, that is, the AP may use the AP-dhk to decrypt capability information that is encrypted by the terminal by using the STA-dhk, and the terminal may also use the STA-dhk to decrypt capability information that is encrypted by the AP by using the AP-dhk.

It should be understood that the terminal and the AP may alternatively generate respective encryption keys according to another key exchange algorithm. For example, the terminal and the AP may also generate the respective encryption keys by using an Elliptic Curve Cryptosystems Diffie-Hellman (ECDH) key exchange algorithm.

Optionally, in some embodiments, when sending the public key to the access point, the terminal may send a field value and/or a random number (Number used once, Nonce) to the access point at the same time. For example, when sending the public key to the access point, the terminal may add a field value and/or a Nonce to the second message that carries the public key of the terminal, so that the AP-dhk generated by the access point can be changed and the capability information of the terminal and/or the access point can be better protected by using the encryption key generated by the terminal and/or the access point, thereby improving a user privacy protection capability.

Optionally, in some embodiments, when sending the public key to the terminal, the access point may send a field value and/or a random number (Number used once, Nonce) to the access point at the same time. For example, when sending the public key to the terminal, the access point may add a field value and/or a Nonce to the third message that carries the public key of the access point, so that the AP-dhk generated by the terminal can be changed and the capability information of the terminal and/or the access point can be better protected by using the encryption key generated by the terminal and/or the access point, thereby improving a user privacy protection capability.

Optionally, in some embodiments, the access point and/or the terminal may periodically change respective public/private key pairs. In this way, the encryption keys generated by the access point and the terminal after the public key exchange also periodically change, so that the capability information of the terminal and/or the access point can be better protected by using the encryption key generated by the terminal and/or the access point, thereby improving a user privacy protection capability.

Optionally, in some embodiments, the method further includes receiving, by the terminal, indication information sent by the access point, where the indication information is used to indicate that the access point supports transmitting, with the terminal, the encrypted capability information of the terminal.

It should be understood that, that the access point supports transmitting, with the terminal, the encrypted capability information of the terminal may also be referred to as that the access point supports the security association mode, or an anti-tracking operation mode, or may be certainly referred to as that the access point supports another mode. This is not limited in this embodiment of the present invention. It should also be understood that, in this embodiment of the present invention, the terminal needs to determine a feature that the access point supports transmitting, with the terminal, the encrypted capability information of the terminal. Certainly, the AP may also support, by default, transmitting, with the terminal, the encrypted capability information of the terminal. That is, the AP may be not required to send the indication information separately to the terminal, to indicate that the AP supports transmitting, with the terminal, the encrypted capability information of the terminal. The terminal considers, by default, that the AP supports transmitting, with the terminal, the encrypted capability information of the terminal.

It should also be understood that, in this embodiment of the present invention, sending the indication information to the terminal by the access point may also be referred to as a capability discovery process, that is, the terminal receives the indication information sent by the access point, to discover that the access point supports the security association mode.

Optionally, in some embodiments, the receiving, by the terminal, indication information sent by the access point includes receiving, by the terminal, the probe response message sent by the access point, where the probe response message includes the indication information.

After receiving the probe request message sent by the terminal, the access point may add the indication information to the probe response message sent to the terminal. Specifically, an IE may be newly defined in the probe response message sent to the terminal, where the IE may be used to carry the indication information, to indicate that the AP supports the security association mode. Certainly, the access point may alternatively use an existing IE in the probe response message to carry the indication information.

It should be understood that, in this embodiment of the present invention, the terminal may alternatively add, to the probe request message, indication information indicating that the terminal supports the security association mode. In this case, the AP may also reply the terminal with the probe response information to implicitly indicate that the AP supports the security association mode. That is, the AP does not need to add, to the probe response message, the indication information that the AP supports the security association mode.

Optionally, in some embodiments, the receiving, by the terminal, indication information sent by the access point includes receiving, by the terminal, a fourth message sent by the access point, where the fourth message includes the indication information, and the fourth message is a management message.

Specifically, in this embodiment of the present invention, the fourth message may be a newly defined frame, for example, an Action frame, and the Action frame may carry the indication information indicating that the access point supports transmitting, with the terminal, the encrypted capability information of the terminal, that is, the access point may use a newly defined frame to carry the indication information, so as to indicate that the access point supports the security association mode.

It should be understood that, in this embodiment of the present invention, the AP uses the newly defined Action frame to carry that the AP supports the security association mode. In this case, the AP first receives a newly defined Action frame sent by the terminal, and the Action frame of the terminal may carry that the terminal also supports the security association mode. Certainly, the Action frame sent by the terminal to the AP may either not carry the indication information that the terminal supports the security association mode. The terminal supports the security association mode by default. When the Action frame sent by the terminal to the AP carries the indication information indicating that the terminal supports the security association mode, the AP may either not add, to the Action frame sent to the terminal, the indication information indicating that the AP supports the security association mode, to implicitly indicate that the AP supports the security association mode.

Optionally, in some embodiments, the receiving, by the terminal, indication information sent by the access point includes receiving, by the terminal, a beacon frame sent by the access point, where the beacon frame includes the indication information.

Specifically, in this embodiment of the present invention, an IE may be newly defined in the beacon frame, and the IE is used to carry the indication information, to indicate that the AP supports the security association mode. Certainly, the indication information may alternatively be carried by using an existing IE in the beacon frame.

It should be understood that the terminal may obtain, in another manner, the indication information indicating that the AP supports the security association mode. For example, the AP may send a broadcast message and/or another synchronization message to the terminal in a broadcast manner, and the indication information may be carried in the broadcast message and/or the another synchronization message. After hearing the broadcast message, the terminal may learn that the AP supports the security association mode. Herein, the AP may also send the indication information to another device. When a terminal that needs to be associated with the AP hears the indication information, the terminal may know that the AP supports the security association mode. Certainly, a person skilled in the art may also obtain, according to an actual application scenario, other indication information indicating that the access point supports the security association mode. This is not limited in this embodiment of the present invention.

The technical solution of this embodiment of the present invention may also be used as a proprietary technical solution by a manufacturer, that is, the technical solution of this embodiment of the present invention may be used for equipments of a same manufacturer. This manner may be implemented by extending a vendor specific information element (Vender Specific IE) in an existing message.

An example in which a STA (or referred to as a terminal) is a wearable device and an AP is a smartphone is used in the following to describe in detail the association establishment method in a wireless local area network in this embodiment of the present invention. It should be understood that the example in which the AP is a smartphone and the STA is a wearable device is merely used for ease of description, and should not constitute any limitation on the protection scope of the embodiments of the present invention. It should also be understood that the smartphone, like the STA, also have a privacy protection requirement when being used as the AP. It should also be understood that, in this embodiment of the present invention, the STA may also be a terminal.

Figure 4:
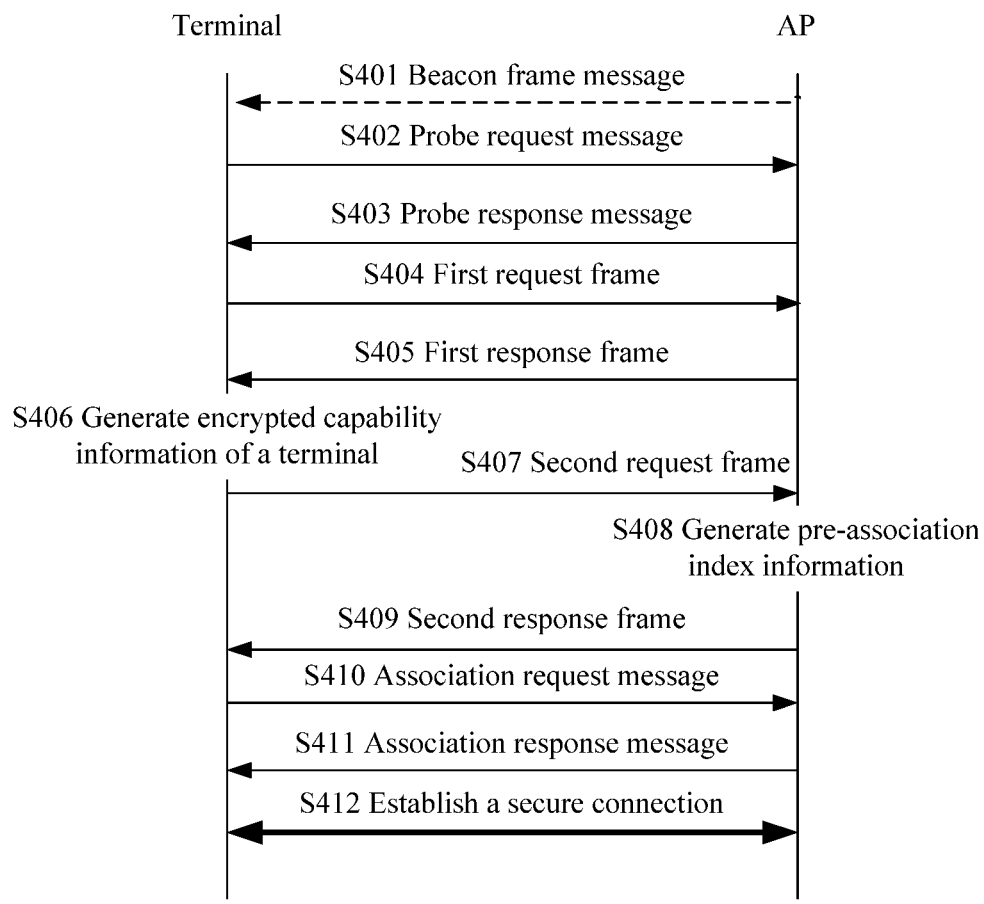
FIG. 4 is a flowchart of an association establishment method in a wireless local area network according to another embodiment of the present invention.

FIG. 4 shows a flowchart of an association establishment method in a wireless local area network according to an embodiment of the present invention. The method includes the following steps.

S401. A terminal receives a beacon frame sent by an AP.

Optionally, in some embodiments, the beacon frame may carry indication information indicating that the AP supports a security association mode with the terminal.

Specifically, in this embodiment of the present invention, the beacon frame may include a newly defined IE, and the newly defined IE may carry the indication information.

It should be understood that the security association mode may be that the AP supports transmitting device capability information with the terminal in an encrypted manner. That is, the AP supports the technical solution of this embodiment of the present invention.

Optionally, in some embodiments, the beacon frame may carry a public key of the AP.

Specifically, the beacon frame may include a newly defined IE, and the IE may carry the public key of the AP.

It should be understood that the public key of the AP is corresponding to a private key of the AP, and the STA may generate an encryption key of the STA by using the public key. It should be understood that a process of generating the encryption key by the terminal is implemented according to at least the public key of the AP and a private key of the terminal. Certainly, the terminal may generate the encryption key with reference to other information, for example, generate the encryption key of the STA according to location information of the terminal, so that the generated encryption key is changed.

Optionally, in some embodiments, the beacon frame may further carry general capability information of the AP.

Specifically, the access point sends the beacon frame to the terminal, and the general capability information of the terminal may be carried in the beacon frame, so that the terminal determines, according to the general capability information of the access point, whether a subsequent association needs to be further performed. It should be understood that, in this embodiment of the present invention, the beacon frame may further carry personalized capability information of the AP when the AP does not require privacy protection.

S402. The terminal sends a probe request message to the AP.

Optionally, in some embodiments, the probe request message may carry general capability information of the terminal. That is, the probe request message may no longer include capability information that is of the terminal and that is intended to be hidden or protected, or include only some capability information that is of the terminal and that has no distinct personalized characteristic. In this way, an attacker cannot obtain, merely by listening to the probe request message, "fingerprint" information that can identify the terminal, so that the terminal cannot be tracked. For example, the terminal may use one or several types of general capability information to indicate a capability of the terminal to the AP, so that the AP determines whether the AP meets a query criterion of the STA (which may also be construed as that the AP determines whether the AP can meet a requirement of the terminal), or the AP determines whether the STA meets a communication condition of the AP. Therefore, the AP determines whether to reply with a probe response message. It should be understood that the terminal sends one or several types of general device capability information, and many other terminals may also use the one or several types of general capability information, therefore, an eavesdropper cannot identify the terminal even if the eavesdropper obtains the general capability information, thereby reducing a probability that the terminal is tracked.

Optionally, in some embodiments, the probe request message may carry indication information indicating that the terminal supports the security association mode.

Optionally, in some embodiments, the probe request message may carry a public key of the terminal, and the public key is used by the AP to generate a decryption key for decrypting encrypted capability information of the terminal.

It should be understood that, in this embodiment of the present invention, the terminal and the AP may use a Diffie-Hellman (DH) key exchange algorithm to calculate and generate respective encryption keys. For example, after obtaining the public key AP-PK of the AP, the terminal may calculate the encryption key STA-dhk of the terminal by using the DH algorithm and the private key STA-pk of the terminal. Likewise, after obtaining the public key STA-PK of the terminal, the AP may also calculate the encryption key AP-dhk of the AP according to the DH algorithm and the private key AP-pk of the AP. The STA-dhk and the AP-dhk herein are same symmetric encryption keys, that is, the AP may use the AP-dhk to decrypt capability information that is encrypted by the terminal by using the STA-dhk, and the terminal may also use the STA-dhk to decrypt capability information that is encrypted by the AP by using the AP-dhk.

It should also be understood that generating the respective encryption keys by the AP and the terminal by using the DH key exchange algorithm is merely an implementation, and a person skilled in the art may also generate the respective encryption keys by using another key exchange algorithm. This is not limited in this embodiment of the present invention.

S403. The access point sends a probe response message to the terminal.

Optionally, in some embodiments, the probe response message may carry the general capability information of the AP.

It should be understood that the probe response message may further carry the personalized capability information of the AP when the AP does not require privacy protection. This is not limited in this embodiment of the present invention.

Optionally, in some embodiments, the probe response message may carry the public key of the AP.

Optionally, in some embodiments, the probe response message may carry the indication information indicating that the access point supports the security association mode.

S404. The terminal sends a first request frame to the access point, where the first request frame is a newly defined management frame.

Specifically, the first request frame may be an Action frame (a management frame). However, the present invention is not limited thereto.

Optionally, in some embodiments, the first request frame may alternatively be another type of frame.

Optionally, in some embodiments, the first request frame may carry the public key of the terminal.

It should be understood that, in this embodiment of the present invention, the access point may calculate the decryption key AP-dhk of the access point according to the DH algorithm after obtaining the public key of the terminal, where the AP-dhk is used to decrypt the capability information of the terminal and may also be used to encrypt capability information of the access point.

Optionally, in some embodiments, the first request frame may carry the general capability information of the terminal.

Specifically, the terminal may add one or more types of general capability information (which may be construed as one or more types of general device capability information) to the first request frame, to indicate the capability information of the terminal to the access point, so that the access point determines whether the access point meets a query criterion of the terminal or whether the terminal meets a communication capability condition of the AP. Therefore, the AP determines whether to reply with a response frame.

Optionally, in some embodiments, the first request frame may carry the indication information indicating that the terminal supports the security association mode.

It should be understood that the first request frame herein may be corresponding to the second message in the claims.

S405. The access point sends a first response frame to the terminal, where the first response frame is a newly defined management frame.

Specifically, the first response frame may be an Action frame (a management frame). However, this embodiment of the present invention is not limited thereto.

Optionally, in some embodiments, the first response frame may alternatively be another type of frame.

Optionally, in some embodiments, the first response frame may carry the general capability information of the access point.

Optionally, in some embodiments, the first response frame may carry the public key of the access point.

It should be understood that, in this embodiment of the present invention, the terminal may calculate the encryption key STA-dhk of the terminal according to the DH algorithm after obtaining the public key of the terminal, where the STA-dhk is used to decrypt the capability information of the terminal and may also be used to encrypt the capability information of the access point. It should also be understood that the AP may add the personalized capability information of the access point to the first response frame when the AP does not require privacy protection. If the AP also requires privacy protection, when the access point has obtained the public key of the terminal, the access point may generate the AP-dhk according to the public key of the terminal, the private key of the access point, and like information, to encrypt the personalized capability information of the access point. When sending the public key of the access point to the terminal, the access point may send the encrypted capability information of the access point by using a same message. After receiving the encrypted capability information of the access point and the public key of the access point, the terminal may calculate the STA-dhk to decrypt the device capability information of the access point, so as to obtain the capability information of the access point. Alternatively, if the access point also requires privacy protection, the access point may either not send device information, that is, the access point does not send personalized device capability information. In this way, privacy leakage is not caused due to "fingerprint" information included the device capability information sent by the access point. The general capability information of the access point may be used by the terminal to determine whether a requirement of the terminal is met, so as to determine whether to further perform capability information transmission or an association. This is not limited in this embodiment of the present invention.

Optionally, in some embodiments, the first response frame may carry the indication information indicating that the access point supports the security association mode.

It should be understood that, in this embodiment of the present invention, when the first request frame sent to the access point by the terminal carries the indication information that the terminal supports the security association mode, the access point may also reply to the terminal with the first response frame only, to implicitly indicate that the access point supports the security association mode. That is, the access point does not add, to the first response frame, the indication information indicating that the access point supports the security association mode.

It should also be understood that the first response frame herein may be corresponding to the third message and/or the fourth message in the claims. For example, when the first response frame carries the public key of the access point, the first response frame may be corresponding to the third message in the claims, when the first response frame carries indication information that the access point supports transmitting, with the terminal, the encrypted capability information of the terminal, the first response frame may be corresponding to the fourth message in the claims. Certainly, the first response frame herein may alternatively be both the third message and the fourth message, that is, the third message and the fourth message may be a same message, and the same message may be the first response frame herein.

S406. The terminal generates encrypted capability information of the terminal.

Specifically, in this embodiment of the present invention, after obtaining the public key of the access point, the terminal may generate, by using the DH algorithm and the private key of the terminal, the encryption key for encrypting the capability information of the terminal, and then encrypts the capability information of the terminal by using the encryption key.

It should be understood that, in this embodiment of the present invention, a reference numeral S406 does not limit an execution order of this step. Once the terminal obtains the public key of the access point, the terminal may generate the encrypted capability information of the terminal according to the generated encryption key. This is not limited in this embodiment of the present invention.

Optionally, in some embodiments, the access point and the terminal may add location information and/or a Nonce when calculating the respective encryption keys according to the DH algorithm.

When the encryption key is calculated, the location information and/or the Nonce that is added may change encrypted content. Certainly, the STA or the AP may alternatively change a public/private key pair of the STA or the AP at regular intervals.

S407. The terminal sends a second request frame to the access point, where the second request frame carries the encrypted capability information of the terminal, and the second request frame is a newly defined management frame.

The encrypted capability information of the terminal is sent to the access point by using the newly defined management frame, so as to avoid sending the capability information of the terminal directly over an air interface, and prevent the attacker from obtaining the capability information of the terminal by listening to a message over the air interface and from generating "fingerprint" feature information of the terminal according to information in the capability information to track the terminal.

Optionally, in some embodiments, the second request frame may be a Public Action frame.

Optionally, in some embodiments, the second request frame may alternatively be another type of frame. This is not limited in this embodiment of the present invention.

It should be understood that the second request frame herein may be corresponding to the first message in the claims.

S408. The access point generates pre-association index information according to capability information of the terminal, where the pre-association index information is used to identify the terminal.

Specifically, in this embodiment of the present invention, after obtaining the public key of the terminal, the AP may generate, according to the private key of the access point and the DH algorithm, the decryption key for decrypting the encrypted capability information of the terminal. After receiving the capability information of the terminal sent by the terminal, the access point decrypts the encrypted capability information of the terminal by using the decryption key generated by the access point, to obtain the capability information of the terminal. After obtaining the capability information of the terminal, the access point may determine whether the access point meets a requirement of an AP that the terminal is searching for, or determine whether the terminal meets a requirement of association with the access point, so as to determine whether to continue subsequent communication with the terminal.

It should be understood that, in this embodiment of the present invention, the pre-association index information may be unique for a period of time, that is, it is acceptable as long as the pre-association index information distinguishes between different terminals. Certainly, the pre-association index information may also be set to be unique for a long enough time, so that the access point may determine, when subsequently receiving an association request of the terminal, the capability information corresponding to the terminal and use a corresponding capability to establish an association in a subsequent association process.

Optionally, in some embodiments, the pre-association index information may be corresponding to one type of device capability information.

For example, in this embodiment of the present invention, a terminal having capability information 1 is corresponding to a pre-association index 1, and a terminal having capability information 2 is corresponding to a pre-association index 2. For details, refer to the aforementioned related content.

S409. The access point sends a second response frame to the terminal, where the second response frame carries the pre-association index information generated by the access point, and the second response frame is a newly defined management frame.

Optionally, in some embodiments, the pre-association index information carried in the second response frame may be encrypted pre-association index information.

Specifically, in this embodiment of the present invention, the access point may encrypt the pre-association index information by using the encryption key that is generated after the access point performs public key exchange with the terminal. In this case, the terminal may decrypt the encrypted pre-association index information by using the decryption key that is generated after the terminal performs public key exchange with the access point. The pre-association index information is used when the terminal subsequently initiates an association to the access point, so that the access point knows what capability is to be used for communication with the terminal, that is, the access point remembers the capability information of the terminal by using the pre-association index information, and can determine, by using the pre-association index information in subsequent communication, a terminal corresponding to the pre-association index information. In this case, even if the terminal uses a different MAC address to send an association request, the access point can also determine which terminal an association request of a new MAC address is corresponding to, or determine capability information of the terminal.

Optionally, in some embodiments, the second response frame may be a newly defined management frame, for example, a Public Action frame.

Optionally, in some embodiments, the second response frame may alternatively be another type of frame. This is not limited in this embodiment of the present invention.

It should be understood that the second response frame herein may be corresponding to the fifth message in the claims.

S410. The terminal sends an association request message to the access point, where the association request message carries the pre-association index information.

It should be understood that, in this embodiment of the present invention, the terminal sends the association request message to the access point, where the association request message may carry no personalized capability information of the terminal. It can be figured out that, in this embodiment of the present invention, all device capability information that is of the terminal and that may leak terminal privacy information may be sent in an encrypted manner to the access point before the terminal sends an association request to the access point.

Optionally, in some embodiments, the terminal further adds encrypted device capability information of the terminal to the association request message, and the access point may decrypt the encrypted capability information of the terminal by using the AP-dhk that is generated according to information exchanged in the previous steps. The decryption key herein may be determined by using a pre-association index. In this embodiment, the pre-association index information is used to identify a corresponding terminal or to further correspond to the encryption key used by the terminal. The index information is used by the AP to determine the decryption key for decrypting the encrypted capability information of the terminal.

Optionally, in some embodiments, the terminal sends an association request to the access point, where the association request may carry the encrypted pre-association index information.

Specifically, the terminal may encrypt the pre-association index information by using the encryption key that is generated after the terminal performs public key exchange with the access point. When a MAC address used by the terminal before the terminal sends the association request message to the access point is the same as a MAC address used by terminal for sending the association request message, after the access point receives the encrypted pre-association index information, the access point may determine, by using the MAC address of the association request message, a corresponding decryption key to decrypt the pre-association index information, so as to determine the device capability information of the terminal according to the pre-association index information.

S411. The access point sends an association response message to the terminal, so as to establish an association with the terminal.

Specifically, after receiving the association request sent by the terminal, the access point determines the capability information of the terminal according to the pre-association index information in the association request, or when the encrypted device capability information is directly carried in the association request message, decrypts the encrypted device capability information by using the decryption key determined according to the pre-association index information, so as to send the association response message to the terminal to establish the association with the terminal.

S412. The access point establishes a secure connection to the terminal.

It should be noted that sequence numbers of the foregoing processes do not mean an execution order in this embodiment of the present invention. In addition, the foregoing processes are not necessarily performed in an entire process of establishing the association between the terminal and the access point. For example, in a process of exchanging the public keys between the terminal and the access point, the terminal may add the public key of the terminal to the probe request message, and the access point may add the public key of the access point to the probe response message. In this case, step S401 may be used as an optional step. Steps S402 and S403 may be replaced by steps S404 and S405, that is, in steps S402 to S405, only S402 and S403 may be performed, or only S404 and S405 may be performed.

It should be understood that the execution order and execution necessity of the processes should be determined according to functions and internal logic of the processes, and should not constitute any limitation on an implementation process of this embodiment of the present invention.

It should also be understood that, in this embodiment of the present invention, the first request frame, the second request frame, the first response frame, and the second response frame may be newly defined frames, which may also be referred to as message frames or messages herein. A specific sequence number, such as first or second, may be determined according to an actual situation. The sequence numbers herein, such as first and second, are intended for ease of presentation, and can be used to distinguish between different objects. Certainly, the first request frame and the second request frame herein may be a same message (that is, a same object), and the first response frame and the second response frame may also be a same message. That is, multiple types of information may be carried in a same message, for example, both the public key of the terminal and the encrypted capability information of the terminal may be carried in the first request frame in this embodiment of the present invention. This can be determined by a person skilled in the art according to a specific application scenario, and is not limited in this embodiment of the present invention.

It should be understood that, if the AP and the terminal perform capability discovery in S401 to S405, the process may also be referred to as an AP capability discovery process, if the AP and the terminal perform key exchange in S401 to S405, the process may also be referred to as an encryption key generation process. S406 to S409 may also be referred to as a process of sending the encrypted terminal capability information. S410 to S411 may also be referred to as a process of association establishment between the AP and the terminal. Division of the processes herein should not constitute any limitation on this embodiment of the present invention.

It should also be understood that a core idea of the association establishment method in a wireless local area network in FIG. 4 is that a newly defined frame, such as a Public action frame, may be used to transmit the encrypted capability information of the terminal, so as to protect personalized information of the terminal from being attacked by the eavesdropper and protect user privacy information.

Figure 5:
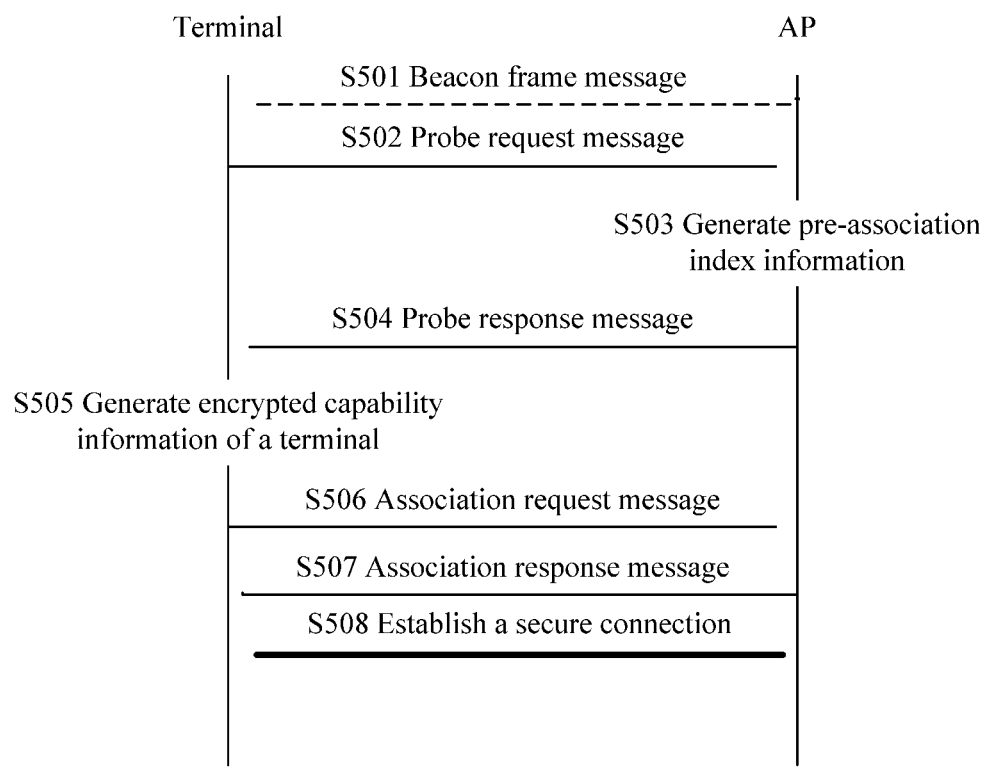
FIG. 5 is a flowchart of an association establishment method in a wireless local area network according to still another embodiment of the present invention.

FIG. 5 shows a flowchart of a method for establishing a secure connection in a wireless local area network according to another embodiment of the present invention. The method includes the following steps.

S501. A terminal receives a beacon frame sent by an access point.

Optionally, in some embodiments, the beacon frame may carry indication information indicating that the AP supports a security association mode with the terminal.

It should be understood that the security association mode may be that the AP supports transmitting device capability information with the terminal in an encrypted manner. That is, the AP supports the technical solution of this embodiment of the present invention.

Optionally, in some embodiments, the beacon frame may carry a public key of the AP. The public key of the AP herein may be different each time, or be modified after a period of time, or remain the same. That is, the AP may change a public/private key pair of the AP according to performance or a parameter of the AP, so that an encryption key generated by the terminal according to the public key of the access point may be changed.

It should be understood that the public key of the AP is corresponding to a private key of the AP, and the public key that is of the access point and that is sent by the access point to the terminal may be used by the STA to generate the encryption key of the STA.

Optionally, in some embodiments, the beacon frame may further carry general capability information of the AP.

It should be understood that the beacon frame may further carry personalized information of the AP when the AP does not require privacy protection.

S502. The terminal sends a probe request message to the access point.

Optionally, in some embodiments, the probe request message may carry general capability information of the terminal. That is, the probe request message no longer includes capability information that is of the terminal and that is intended to be hidden or protected, or includes only some capability information that is of the terminal and that has no distinct personalized characteristic. That is, an attacker cannot obtain, merely by listening to the probe request message, "fingerprint" information that can identify the terminal, to track the terminal subsequently. For example, the terminal can use one or several types of general capability information to indicate a capability of the terminal to the AP, so that the AP determines whether a query criterion of the STA is met or whether the STA meets a communication condition of the AP. Therefore, the AP determines whether to reply with a probe response message. It should be understood that the terminal sends one or several types of general device capability information and many other terminals may also use the several types of general device capability information, thereby reducing a probability that the terminal is tracked. Certainly, capability information of the terminal may alternatively not be carried in the probe request message.

Optionally, in some embodiments, the probe request message may carry indication information indicating that the terminal supports the security association mode.

Optionally, in some embodiments, the probe request message may carry a public key of the terminal, and the public key is used by the AP to generate a decryption key for decrypting encrypted capability information of the terminal.

Optionally, in some embodiments, when the beacon frame in S501 includes public key information of the access point, the terminal is already able to generate encryption key information according to the public key information of the access point and private key information of the terminal before sending the probe request message in S502, so as to generate the encrypted capability information of the terminal (corresponding to step S503). In this case, the terminal may add the encrypted capability information of the terminal to the probe request message in step S502.

It should be understood that, in this embodiment of the present invention, the terminal and the AP may use a Diffie-Hellman (DH) key exchange algorithm to calculate and generate respective encryption keys. For example, after obtaining the public key AP-PK of the AP, the terminal may calculate the encryption key STA-dhk of the terminal by using the DH algorithm and a private key STA-pk of the terminal. Likewise, after obtaining the public key STA-PK of the terminal, the AP may also calculate the encryption key AP-dhk of the AP according to the DH algorithm and the private key AP-pk of the AP. The STA-dhk and the AP-dhk herein are same symmetric encryption keys, that is, the AP may use the AP-dhk to decrypt capability information that is encrypted by the terminal by using the STA-dhk, and the terminal may also use the STA-dhk to decrypt capability information that is encrypted by the AP by using the AP-dhk.

It should also be understood that generating the respective encryption keys by the AP and the terminal by using the DH key exchange algorithm is merely an implementation, and a person skilled in the art may also generate the respective encryption keys by using another key exchange algorithm. This is not limited in this embodiment of the present invention.

S503. The access point generates pre-association index information, where the pre-association index information is used to identify the terminal.

Specifically, in this embodiment of the present invention, after obtaining the public key that is of the terminal and that is carried in the probe request message, the access point may generate, according to the private key of the access point and the DH algorithm, the decryption key for decrypting the encrypted capability information of the terminal. It should be understood that, in this embodiment of the present invention, the encryption key STA-dhk of the terminal and the decryption key AP-dhk of the access point that are generated by using the DH key exchange algorithm by the terminal and the AP, respectively, may be the same, that is, the encryption key STA-dhk of the terminal may also be used to decrypt device capability information that is of the access point and that is encrypted by the access point by using the decryption key AP-dhk. In this case, the access point generates the pre-association index message, where the pre-association index message is to be used by the terminal to initiate a subsequent association, that is, at the time of the subsequent association, according to the pre-association index information, the access point may determine the terminal or further determine the encryption key corresponding to the terminal.

It should be understood that, in this embodiment of the present invention, the pre-association index information may be unique for a period of time, that is, it is acceptable as long as the pre-association index information distinguishes between different terminals. Certainly, the pre-association index information may also be set to be unique for a long enough time, so that the access point may determine, when subsequently receiving an association request of the terminal, the capability information corresponding to the terminal and use a corresponding capability to establish an association in a subsequent association process.

It should be understood that, when the probe request message sent in step S502 includes the encrypted capability information of the terminal, after step 502, that is, when the AP receives the probe request message, the encrypted capability information of the terminal and public key information of the terminal have been included in the probe request message. In this case, the AP can generate the decryption key with reference to the private key of the AP, the public key information of the terminal, and other information (if other information is required herein, the other information needs to be confirmed by the AP and the terminal in an interaction process, or indicated by using a message), so as to decrypt encrypted device capability information to obtain the capability information of the terminal.

S504. The access point sends a probe response message to the terminal, where the probe response message carries the pre-association index information.

It should be understood that, in this embodiment of the present invention, the pre-association index information carried in the probe request message may be encrypted, that is, the access point may encrypt the pre-association index information by using the encryption key that is generated after the access point performs public key exchange with the terminal. Certainly, the pre-association index information carried in the probe request message may alternatively be unencrypted.

Optionally, in some embodiments, the probe response message may carry the general capability information of the AP.

It should be understood that, in this embodiment of the present invention, if the access point also requires privacy protection, the probe response message may also carry encrypted capability information of the access point.

It should be understood that the probe response message may further carry personalized capability information of the AP when the AP does not require privacy protection. This is not limited in this embodiment of the present invention.

Optionally, in some embodiments, the probe response message may carry the public key of the AP.

Optionally, in some embodiments, the probe response message may carry the indication information indicating that the terminal supports the security association mode.

S505. The terminal generates encrypted capability information of the terminal.

Specifically, in this embodiment of the present invention, after obtaining the public key of the access point, the terminal may generate, by using the DH algorithm and the private key of the terminal, the encryption key for encrypting the capability information of the terminal, and then encrypts the capability information of the terminal by using the encryption key.

It should be understood that, in this embodiment of the present invention, a reference numeral S505 does not limit an execution order of this step. Once the terminal obtains the public key of the access point, the terminal can generate the encrypted capability information of the terminal. This is not limited in this embodiment of the present invention.

Optionally, in some embodiments, the access point and the terminal may add location information and/or a Nonce when calculating the respective encryption keys according to the DH algorithm. It should be understood that, if a field value or other information is used herein, the field value or the other information needs to be carried in a message by using which the terminal sends the public key to the AP or the AP sends the public key to the terminal, or be carried in another message.

When the encryption key is calculated, the location information and/or the Nonce that is added may change encrypted content. Certainly, the STA or the AP may alternatively change a public/private key pair of the STA or the AP at regular intervals.

S506. The terminal sends an association request message to the access point, where the association request message includes the encrypted capability information of the terminal and the pre-association index information.

In this embodiment of the present invention, the encrypted capability information of the terminal is transmitted by using existing signaling, thereby saving signaling overheads. The capability information of the terminal and the pre-association index information are sent to the access point in an encrypted manner, so as to avoid sending the capability information of the terminal directly over an air interface, and prevent an attacker from obtaining the capability information of the terminal by listening to a message over the air interface and from generating "fingerprint" feature information of the terminal according to information in the capability information to track the terminal.

It should be understood that, in this embodiment of the present invention, the encrypted capability information of the terminal is sent to the access point by using the association request message. In this case, the access point may determine the terminal by using the pre-association index information carried in the association request message, so that even if a MAC address for sending an association request by the terminal is changed, the access point can still determine the terminal with a changed MAC address by using the pre-association index information, and decrypt the encrypted capability information of the terminal by using a decryption key corresponding to the terminal.

S507. The access point sends an association response message to the terminal, so as to establish an association with the terminal.

Specifically, after receiving the encrypted capability information of the terminal and the pre-association index information that are sent by the terminal by using the association request message, the access point determines, according to the pre-association index information, the decryption key for decrypting the encrypted capability information of the terminal, and decrypts the encrypted capability information of the terminal according to the decryption key, so as to obtain the capability information of the terminal. The access point determines, according to the capability information of the terminal, whether to send the association response message to the terminal. After the association response message is sent to the terminal, the association is established between the access point and terminal.

S508. The access point and terminal establish a secure connection.

It should be noted that sequence numbers of the foregoing processes do not mean an execution order in this embodiment of the present invention. In addition, the foregoing processes are not necessarily performed in an entire process of establishing the association between the terminal and the access point. For example, in a process of exchanging the public keys between the terminal and the access point, the terminal may add the public key of the terminal to the probe request message, and the access point may add the public key of the access point to the probe response message. In this case, steps S504 and S505 may be used as optional steps when the steps are merely used as steps of exchanging the public keys. It should be understood that the execution order and execution necessity of the processes should be determined according to functions and internal logic of the processes, and should not constitute any limitation on an implementation process of this embodiment of the present invention.

It should be understood that, in a specific embodiment shown in the foregoing FIG. 5, a core idea is to add an information element or an existing information element to a prior-art message to implement the technical solution of this embodiment of the present invention, but not to add a newly defined message. Certainly, this embodiment herein makes a description merely by using an example in which the encrypted capability information of the terminal is carried in the association request message. However, this embodiment of the present invention is not limited thereto. For example, the encrypted capability information of the terminal can also be carried in the probe request message.

The foregoing describes in detail the association establishment method in a wireless local area network in the embodiments of the present invention. The following describes in detail an access point and an terminal in an embodiment of the present invention.

Figure 6:
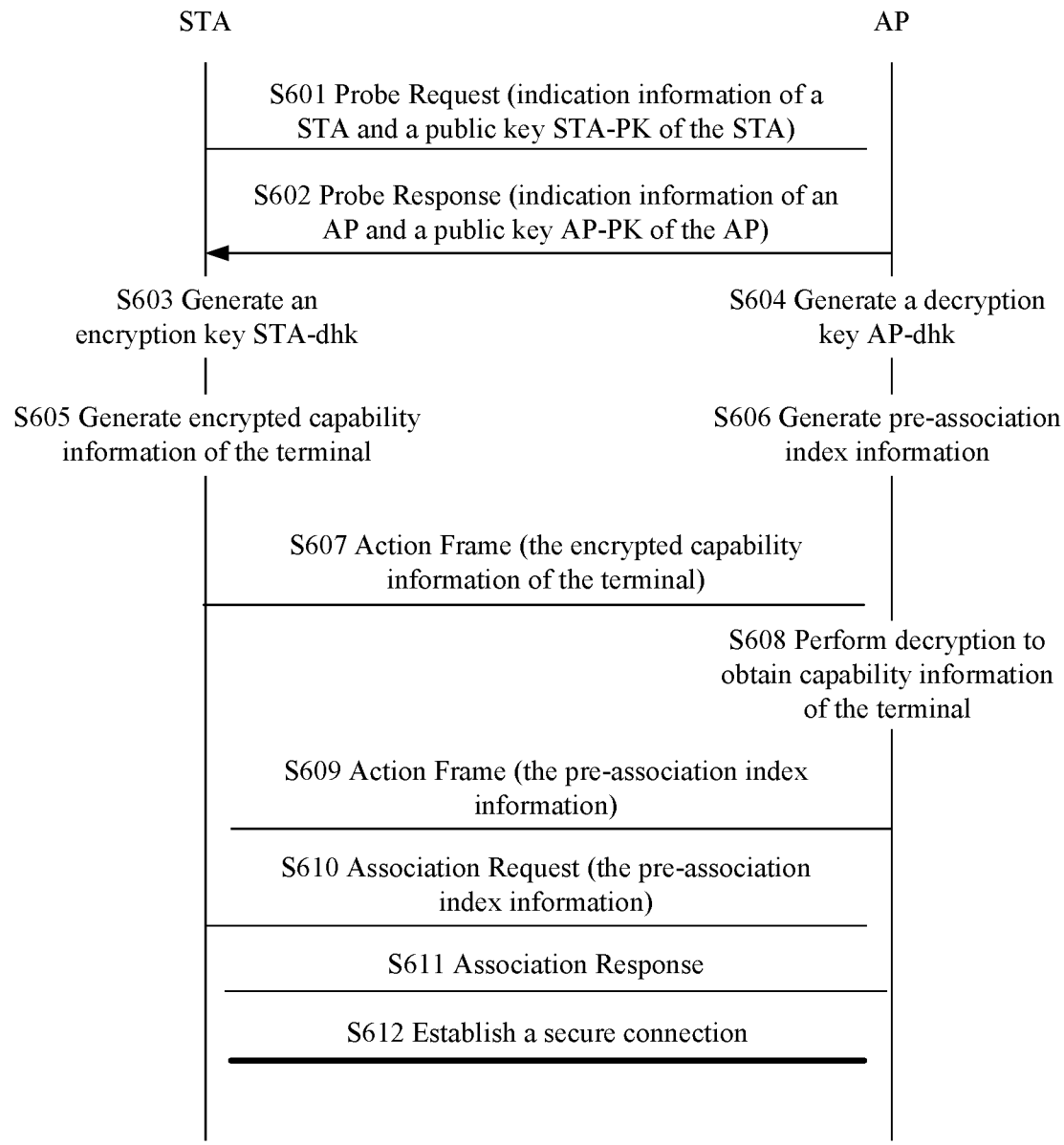
FIG. 6 is a flowchart of an association establishment method in a wireless local area network according to still another embodiment of the present invention.

FIG. 6 is a schematic diagram of an association establishment method in a wireless local area network according to an embodiment of the present invention. The method includes the following steps.

S601. A terminal sends a probe request message (Probe Request) to an access point, where the probe request message includes a public key STA-PK of the terminal and indication information indicating that the terminal supports a security association mode.

S602. The access point sends a probe response message (Probe Response) to the terminal, where the probe response message includes a public key AP-PK of the access point and indication information indicating that the access point supports the security association mode.

S603. The terminal generates an encryption key STA-dhk according to a private key STA-pk of the terminal and the received public key AP-PK of the access point, where the encryption key is used to encrypt capability information of the terminal.

S604. The access point generates a decryption key AP-dhk according to a private key AP-pk of the access point and the received public key STA-PK of the terminal, where the decryption key is used to decrypt the encrypted capability information of the terminal.

S605. The terminal encrypts the capability information of the terminal according to the generated encryption key.

S606. The access point generates pre-association index information, where the pre-association index information is used by the access point to identify the terminal when no association has been established between the terminal and the access point.

S607. The terminal sends an Action frame to the access point, where the Action frame may be a newly defined management frame, and the Action frame may carry the encrypted capability information of the terminal that is generated by the terminal.

S608. The access point receives the encrypted capability information that is of the terminal and that is sent by the terminal, and performs decryption by using the decryption key, to obtain the capability information of the terminal.

S609. The access point sends an Action frame to the terminal, where the Action frame may be a newly defined management frame, and the Action frame may carry the pre-association index information generated by the access point.

S610. The terminal sends an association request message (Association Request) to the access point, where the association request message includes the pre-association index information.

S611. The access point sends an association response message (Association Response) to the terminal according to the pre-association index information sent by the terminal, so that the access point and the terminal complete establishment of a current association.

S612. The access point and terminal establish a secure connection.

A sequence of S603 and S604 may be not limited, and neither a sequence of S604 and S606 nor a sequence of S604 and S607 may be limited.

It should be understood that the association establishment method in a wireless local area network in the embodiment, shown in FIG. 6, of the present invention is merely a specific implementation and should not constitute any limitation on the embodiments of the present invention.

It should also be understood that sequence numbers in the foregoing method should not constitute any limitation on an execution order in this embodiment of the present invention, and the execution order of the steps in this embodiment of the present invention should be subject to internal logic of the steps.

Figure 7:
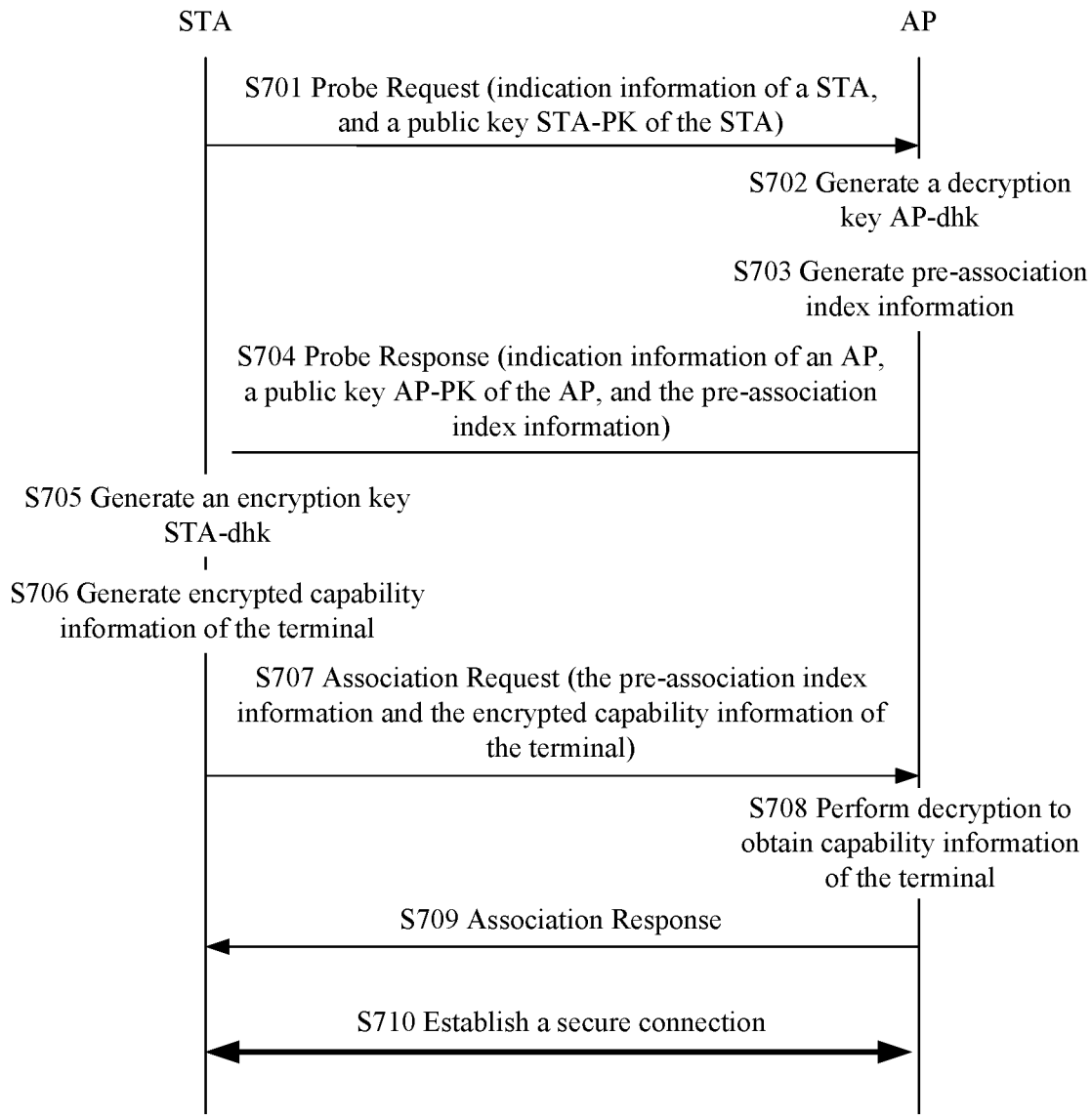
FIG. 7 is a flowchart of an association establishment method in a wireless local area network according to still another embodiment of the present invention.

FIG. 7 is a schematic diagram of an association establishment method in a wireless local area network according to an embodiment of the present invention. The method includes the following steps.

S701. A terminal sends a probe request message (Probe Request) to an access point, where the probe request message includes a public key STA-PK of the terminal and indication information indicating that the terminal supports a security association mode.

S702. The access point generates a decryption key AP-dhk according to a private key AP-pk of the access point and the public key STA-PK that is of the terminal and that is sent by the terminal, where the decryption key is used to decrypt encrypted capability information of the terminal.

S703. The access point generates pre-association index information, where the pre-association index information is used by the access point to identify the terminal when no association has been established between the terminal and the access point.

S704. The access point sends a probe response message (Probe Response) to the terminal, where the probe response message includes indication information indicating that the access point supports the security association mode, a public key AP-PK of the access point, and the pre-association index information.

S705. The terminal generates an encryption key STA-dhk according to the public key AP-PK of the access point and a private key STA-pk of the terminal, where the encryption key is used to encrypt capability information of the terminal.

S706. The terminal encrypts the capability information of the terminal according to the encryption key generated by the terminal.

S707. The terminal sends an association request message (Association Request) to the access point, where the association request message includes the pre-association index information and the encrypted capability information of the terminal.

It should be understood that, after receiving the association request message sent by the terminal, the access point obtains the pre-association index information in the association request message, determines the decryption key of the terminal according to the pre-association index information, so as to decrypt the encrypted capability information of the terminal.

S708. The access point receives the encrypted capability information of the terminal and the pre-association index information that are sent by the terminal, and performs decryption by using the decryption key, to obtain the capability information of the terminal.

S709. The access point sends an association response message (Association Response) to the terminal according to the pre-association index information sent by the terminal, so that the access point and the terminal complete establishment of an association.

S710. The terminal and the access point establish a secure connection.

A sequence of S702 and S704 may be not limited, and a sequence of S702 and S707 may not be limited, either.

It should be understood that the association establishment method in a wireless local area network in the embodiment, shown in FIG. 7, of the present invention is merely a specific implementation and should not constitute any limitation on the embodiments of the present invention.

It should also be understood that sequence numbers in the foregoing method should not constitute any limitation on an execution order in this embodiment of the present invention, and the execution order of the steps in this embodiment of the present invention should be subject to internal logic of the steps.

Figure 8:
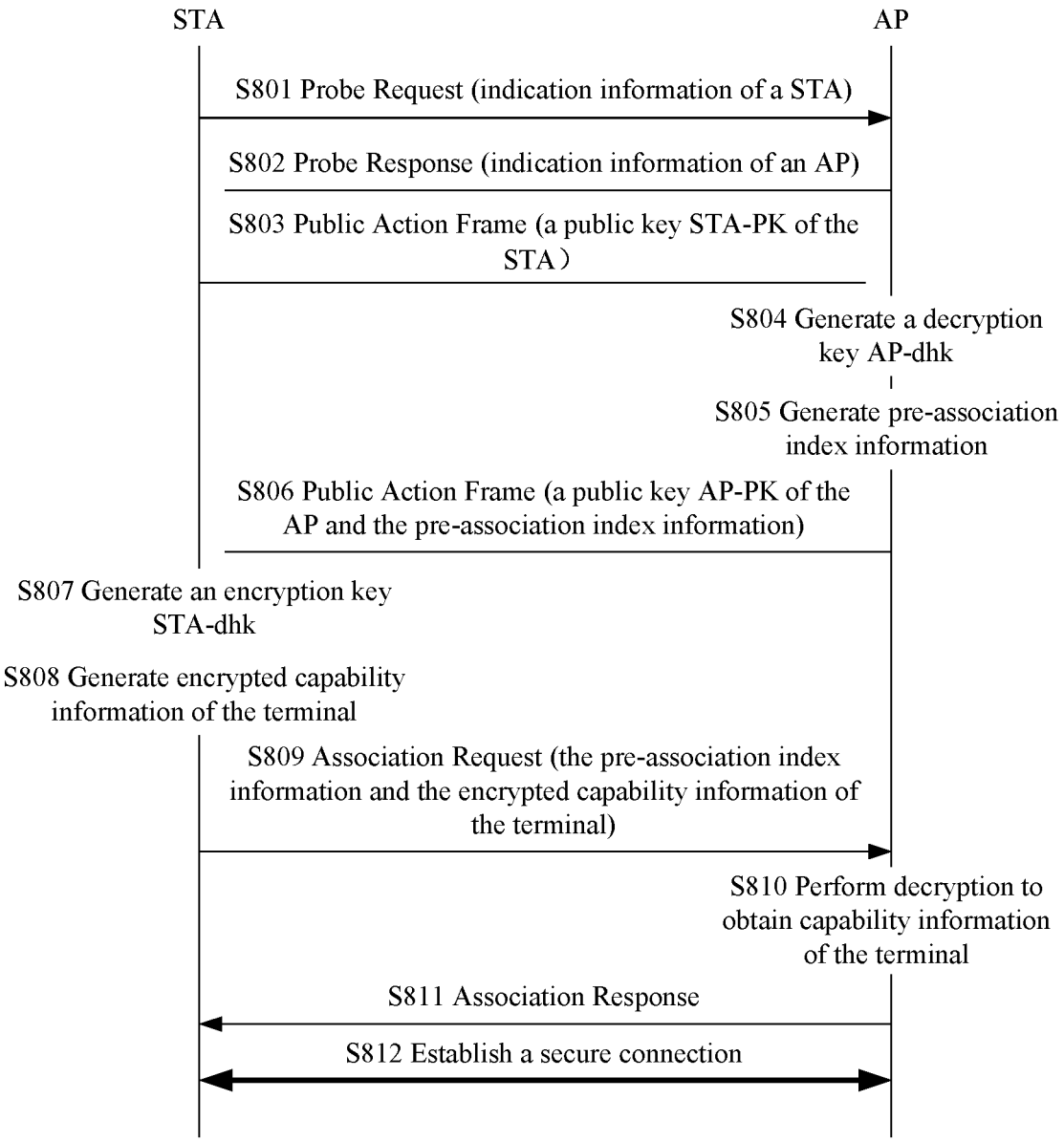
FIG. 8 is a flowchart of an association establishment method in a wireless local area network according to still another embodiment of the present invention.

FIG. 8 is a schematic diagram of an association establishment method in a wireless local area network according to an embodiment of the present invention. The method includes the following steps.

S801. A terminal sends a probe request message (Probe Request) to an access point, where the probe request message includes indication information indicating that the terminal supports a security association mode.

S802. The access point sends a probe response message (Probe Response) to the terminal, where the probe response message includes indication information indicating that the access point supports the security association mode.

S803. The terminal sends a Public Action frame to the access point, where the Public Action frame may be a new management frame, and the Public Action frame may include a public key STA-PK of the terminal.

S804. The access point generates a decryption key AP-dhk according to a private key AP-PK of the access point and the public key STA-PK that is of the terminal and that is sent by the terminal, where the decryption key is used to decrypt encrypted capability information of the terminal.

S805. The access point generates pre-association index information, where the pre-association index information is used by the access point to identify the terminal when no association has been established between the terminal and the access point.

S806. The access point sends a Public Action frame to the terminal, where the Public Action frame may be a new management frame, and the Public Action frame may include a public key AP-PK of the access point and the pre-association index information.

S807. The terminal generates an encryption key STA-dhk according to the public key AP-PK of the access point and a private key STA-pk of the terminal, where the encryption key is used to encrypt capability information of the terminal.

S808. The terminal encrypts the capability information of the terminal according to the encryption key generated by the terminal.

S809. The terminal sends an association request message (Association Request) to the access point, where the association request message includes the pre-association index information and the encrypted capability information of the terminal.

It should be understood that, after receiving the association request message sent by the terminal, the access point obtains the pre-association index information in the association request message, determines the decryption key of the terminal according to the pre-association index information, so as to decrypt the encrypted capability information of the terminal.

S810. The access point receives the encrypted capability information of the terminal and the pre-association index information that are sent by the terminal, and performs decryption by using the decryption key, to obtain the capability information of the terminal.

S811. The access point sends an association response message (Association Response) to the terminal according to the pre-association index information sent by the terminal, so that the access point and the terminal complete establishment of a current association.

S812. The terminal and the access point establish a secure connection.

A sequence of S804 and S806 may be not limited, and a sequence of S804 and S809 may be limited, either.

It should be understood that the association establishment method in a wireless local area network in the embodiment, shown in FIG. 8, of the present invention is merely a specific implementation and should not constitute any limitation on the embodiments of the present invention.

It should also be understood that sequence numbers in the foregoing method should not constitute any limitation on an execution order in this embodiment of the present invention, and the execution order of the steps in this embodiment of the present invention should be subject to internal logic of the steps.

Figure 9:
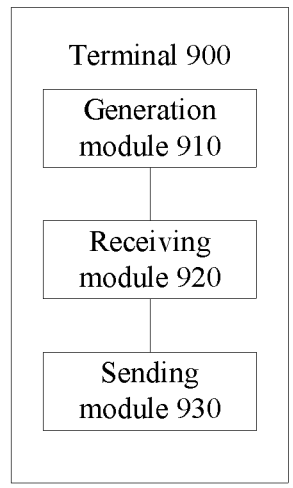
FIG. 9 is a schematic block diagram of a terminal according to an embodiment of the present invention.

FIG. 9 shows a schematic block diagram of a terminal according to an embodiment of the present invention. The terminal may be the smartphone shown in FIG. 2, and the terminal 900 includes a generation module 910, configured to generate encrypted capability information of the terminal, a receiving module 920, configured to receive pre-association index information that is related to the terminal and that is sent by an access point, where the pre-association index information is used by the access point to identify the terminal when no association has been established between the terminal and the access point, and a sending module 930, configured to send the encrypted capability information of the terminal and an association request message to the access point, where the association request message includes the pre-association index information.

The receiving module 920 is further configured to receive an association response message that is sent by the access point according to capability information of the terminal and the pre-association index information, so that the terminal establishes an association with the access point.

According to the terminal in this embodiment of the present invention, the capability information of the terminal is sent to the access point in an encrypted manner and the terminal is identified by using the pre-association index information, so that an eavesdropper cannot obtain the capability information of the terminal even though the capability information is detected by listening over an air interface before or during association establishment. This can prevent the eavesdropper from determining a location, time, and other information of the terminal according to the capability information of the terminal, and avoid user privacy leakage.

Optionally, in some embodiments, the sending module is specifically configured to send the association request message to the access point, where the association request message includes the encrypted capability information of the terminal.

Optionally, in some embodiments, the sending module is specifically configured to send a first message to the access point, where the first message includes the encrypted capability information of the terminal, and the first message is a management message, and send the association request message to the access point.

Optionally, in some embodiments, the sending module is further configured to send a public key of the terminal to the access point before the sending module sends the encrypted capability information of the terminal, where the public key of the terminal is used by the access point to generate a decryption key for decrypting the capability information of the terminal.

The receiving module is further configured to receive a public key that is of the access point and that is sent by the access point.

The generation module is further configured to generate an encryption key of the terminal according to the public key of the access point, where the encryption key of the terminal is used to encrypt the capability information of the terminal.

Optionally, in some embodiments, the sending module is specifically configured to send a probe request message to the access point, where the probe request message includes the public key of the terminal, or send a second message to the access point, where the second message includes the public key of the terminal, and the second message is a management message.

Optionally, in some embodiments, the receiving module is specifically configured to receive a probe response message sent by the access point, where the probe response message includes the public key of the access point, or receive a third message sent by the access point, where the third message includes the public key of the access point, and the third message is a management message, or receive a beacon frame sent by the access point, where the beacon frame includes the public key of the access point.

Optionally, in some embodiments, the receiving module is further configured to receive indication information sent by the access point, where the indication information is used to indicate that the access point supports transmitting, with the terminal, encrypted device capability information of the terminal.

Optionally, in some embodiments, the receiving module is specifically configured to receive the probe response message sent by the access point, where the probe response message includes the indication information, or receive a fourth message sent by the access point, where the fourth message includes the indication information, and the fourth message is a management message, or receive a beacon frame sent by the access point, where the beacon frame includes the indication information.

Optionally, in some embodiments, the receiving module is specifically configured to receive a fifth message sent by the access point, where the fifth message includes the pre-association index information, and the fifth message is a management message, or receive the probe response message sent by the access point, where the probe response message includes the pre-association index information.

Optionally, in some embodiments, a MAC address used by the terminal to send the association request message to the access point is different from a MAC address used by the terminal before the terminal sends the association request message to the access point.

It should be understood that the terminal herein is embodied in a form of a functional module. The functional modules herein may be corresponding to various physical modules of the smartphone shown in FIG. 2. For example, the generation module herein may be corresponding to a processor of the smartphone in FIG. 2, and the sending module and the receiving module may be corresponding to a radio frequency circuit of the smartphone. It should also be understood that the term "module" herein may be an application-specific integrated circuit, an electronic circuit, a processor configured to execute one or more software or firmware programs (for example, a shared processor, a dedicated processor, or a group processor) and a memory, or a merged logic circuit and/or another appropriate component supporting the described functions. The terminal may be configured to perform various processes and/or steps corresponding to the terminal in the foregoing method embodiments. To avoid repetition, details are not described herein again.

Figure 10:
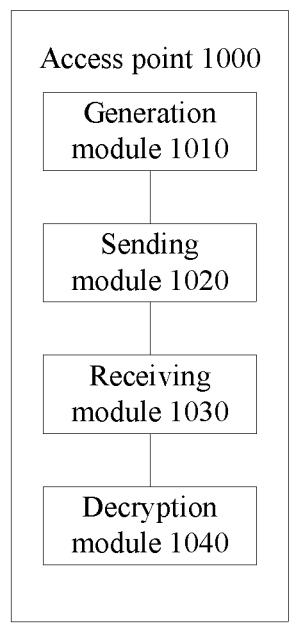
FIG. 10 is a schematic block diagram of an access point according to an embodiment of the present invention.

FIG. 10 shows a schematic block diagram of an access point according to an embodiment of the present invention. The access point may also be corresponding to the smartphone in FIG. 2, and the smartphone, as an access point, may also require privacy protection. The access point 1000 includes a generation module 1010, configured to generate pre-association index information related to a terminal, where the pre-association index information is used by the access point to identify the terminal when no association has been established between the terminal and the access point, a sending module 1020, configured to send the pre-association index information to the terminal, a receiving module 1030, configured to receive encrypted capability information of the terminal and an association request message that are sent by the terminal, where the association request message includes the pre-association index information, and a decryption module 1040, configured to decrypt the encrypted capability information of the terminal.

The sending module 1020 is further configured to send an association response message to the terminal according to capability information of the terminal and the pre-association index information, so that the access point establishes an association with the terminal.

The access point in this embodiment of the present invention supports transmitting, with the terminal, the encrypted capability information of the terminal and identifies the terminal by using the pre-association index information, so that an eavesdropper cannot obtain the capability information of the terminal even though the capability information is detected by listening over an air interface before or during association establishment. This can prevent the eavesdropper from determining a location, time, and other information of the terminal according to the capability information of the terminal, and avoid user privacy leakage.

Optionally, in some embodiments, the receiving module is specifically configured to receive the association request message sent by the terminal, where the association request message includes the encrypted capability information of the terminal.

Optionally, in some embodiments, the receiving module is further configured to receive a first message sent by the terminal, where the first message includes the encrypted capability information of the terminal, and the first message is a management message, and receive the association request message sent by the terminal.

Optionally, in some embodiments, the receiver is further configured to the receiving module is specifically configured to receive a public key that is of the terminal and that is sent by the terminal.

The generation module is further configured to generate a decryption key according to the public key of the terminal, where the decryption key is used for decrypting the encrypted capability information of the terminal.

The sending module is further configured to send a public key of the access point to the terminal, where the public key of the access point is used by the terminal to generate an encryption key for encrypting the capability information of the terminal.

Optionally, in some embodiments, the receiving module is specifically configured to receive a probe request message sent by the terminal, where the probe request message includes the public key of the terminal, or receive a second message sent by the terminal to the access point, where the second message includes the public key of the terminal, and the second message is a management message.

Optionally, in some embodiments, the sending module is specifically configured to send a probe response message to the terminal, where the probe response message includes the public key of the access point, or send a third message to the terminal, where the third message includes the public key of the access point, and the third message is a management message, or send a beacon frame to the terminal, where the beacon frame includes the public key of the access point.

Optionally, in some embodiments, the sending module is further configured to send indication information to the terminal, where the indication information is used to indicate that the access point supports transmitting, with the terminal, encrypted device capability information of the terminal.

Optionally, in some embodiments, the sending module is specifically configured to send the probe response message to the terminal, where the probe response message includes the indication information, or send a fourth message to the terminal, where the fourth message includes the indication information, and the fourth message is a management message, or send a beacon frame to the terminal, where the beacon frame includes the indication information.

Optionally, in some embodiments, the sending module is specifically configured to send a fifth message to the terminal, where the fifth message includes the pre-association index information, and the fifth message is a management message, or send the probe response message to the terminal, where the probe response message includes the pre-association index information.

Optionally, in some embodiments, the generation module is further configured to generate, by the access point, encrypted capability information of the access point.

The sending module is further configured to send the encrypted capability information of the access point to the terminal.

It should be understood that the access point herein is embodied in a form of a functional module. The term "module" herein may be an application-specific integrated circuit, an electronic circuit, a processor configured to execute one or more software or firmware programs (for example, a shared processor, a dedicated processor, or a group processor) and a memory, or a merged logic circuit and/or another appropriate component supporting the described functions. The access point may be configured to perform various processes and/or steps corresponding to the access point in the foregoing method embodiments. To avoid repetition, details are not described herein again.

Figure 11:
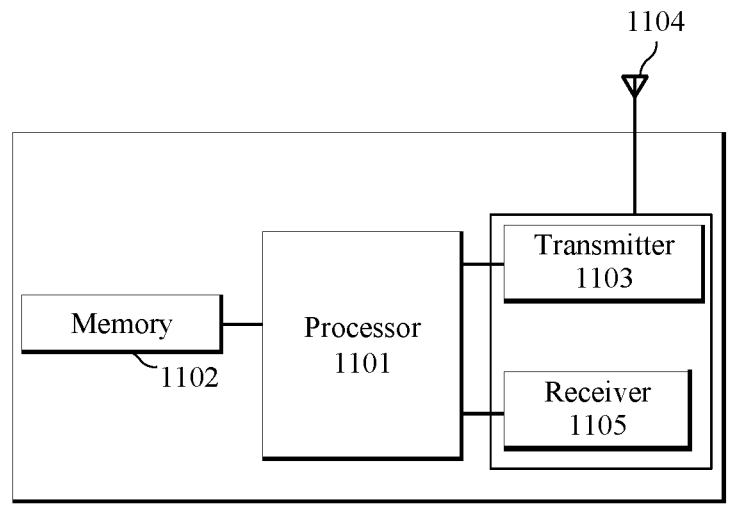
FIG. 11 is a schematic block diagram of a terminal according to another embodiment of the present invention.

FIG. 11 shows a schematic block diagram of a terminal according to another embodiment of the present invention. The terminal includes a processor 1101, a memory 1102, a transmitter 1103, and a receiver 1105. The components in the terminal are connected in a coupling manner. The receiver 1105 receives data by using an antenna 1104, and the transmitter 1103 sends data by using the antenna 1104. It should be noted that the receiver and the transmitter can share an antenna having two types of capabilities signal receiving and signal transmitting, or may use different antennas. This is not limited in this embodiment of the present invention, and the former case is merely used as an example.

The disclosed association establishment method in a wireless local area network in the foregoing embodiments of the present invention may be applied to the processor 1101, or be implemented by the processor 1101. The processor 1101 may be an integrated circuit chip with a signal processing capability. In an implementation process, the steps of the foregoing methods may be implemented by an integrated logical circuit of hardware in the processor 1101, or by using a software instruction. The processor 1101 may be a general purpose processor, a system on chip (SOC, SOC chip), a baseband processor, a digital signal processor (DSP), an application-specific integrated circuit (ASIC), a field programmable gate array (FPGA) or another programmable logical device, a discrete gate or transistor logical device, or a discrete hardware component, and can implement or execute the methods, steps and logical block diagrams disclosed in the embodiments of the present invention. The general purpose processor may be a microprocessor, or the processor may be any conventional processor or the like. The steps of the methods disclosed with reference to the embodiments of the present invention may be directly implemented by a hardware decoding processor, or may be implemented by a combination of hardware and software modules in a decoding processor. The software module may be located in a storage medium that is mature in the art, such as a random access memory (RAM), a flash memory, a read-only memory (ROM), a programmable read-only memory, an electrically erasable programmable memory, or a register. The storage medium is located in the memory 1102. The processor 1101 reads an instruction from the memory 1102 and completes the steps of the foregoing methods in combination with hardware of the processor 1101.

The processor 1101 is configured to generate encrypted capability information of the terminal.

The receiver 1104 is configured to receive pre-association index information that is related to the terminal and that is sent by an access point, where the pre-association index information is used by the access point to identify the terminal when no association has been established between the terminal and the access point.

The transmitter 1103 is configured to send the encrypted capability information of the terminal and an association request message to the access point, where the association request message includes the pre-association index information.

The receiver 1104 is further configured to receive an association response message that is sent by the access point according to capability information of the terminal and the pre-association index information, so that the terminal establishes an association with the access point.

According to the terminal in this embodiment of the present invention, the capability information of the terminal is sent to the access point in an encrypted manner and the terminal is identified by using the pre-association index information, so that an eavesdropper cannot obtain the capability information of the terminal even though the capability information is detected by listening over an air interface before or during association establishment. This can prevent the eavesdropper from determining a location, time, and other information of the terminal according to the capability information of the terminal, and avoid user privacy leakage.

Optionally, in some embodiments, the transmitter is further configured to send the association request message to the access point, where the association request message includes the encrypted capability information of the terminal.

Optionally, in some embodiments, the transmitter is further configured to send a first message to the access point, where the first message includes the encrypted capability information of the terminal, and the first message is a management message, and send the association request message to the access point.

Optionally, in some embodiments, the transmitter is further configured to send a public key of the terminal to the access point before the sending module sends the encrypted capability information of the terminal, where the public key of the terminal is used by the access point to generate a decryption key for decrypting the capability information of the terminal.

The receiving module is further configured to receive a public key that is of the access point and that is sent by the access point.

The generation module is further configured to generate an encryption key of the terminal according to the public key of the access point, where the encryption key of the terminal is used to encrypt the capability information of the terminal.

Optionally, in some embodiments, the transmitter is specifically configured to send a probe request message to the access point, where the probe request message includes the public key of the terminal, or send a second message to the access point, where the second message includes the public key of the terminal, and the second message is a management message.

Optionally, in some embodiments, the receiver is specifically configured to receive a probe response message sent by the access point, where the probe response message includes the public key of the access point, or receive a third message sent by the access point, where the third message includes the public key of the access point, and the third message is a management message, or receive a beacon frame sent by the access point, where the beacon frame includes the public key of the access point.

Optionally, in some embodiments, the receiver is specifically configured to receive indication information sent by the access point, where the indication information is used to indicate that the access point supports transmitting, with the terminal, encrypted device capability information of the terminal.

Optionally, in some embodiments, the receiver is further configured to receive the probe response message sent by the access point, where the probe response message includes the indication information, or receive a fourth message sent by the access point, where the fourth message includes the indication information, and the fourth message is a management message, or receive a beacon frame sent by the access point, where the beacon frame includes the indication information.

Optionally, in some embodiments, the receiver is specifically configured to receive a fifth message sent by the access point, where the fifth message includes the pre-association index information, and the fifth message is a management message, or receive the probe response message sent by the access point, where the probe response message includes the pre-association index information.

Optionally, in some embodiments, a MAC address used by the terminal to send the association request message to the access point is different from a MAC address used by the terminal before the terminal sends the association request message to the access point.

It should be understood that the terminal may be configured to perform various processes and/or steps corresponding to the terminal in the foregoing method embodiments. To avoid repetition, details are not described herein again.

Figure 12:
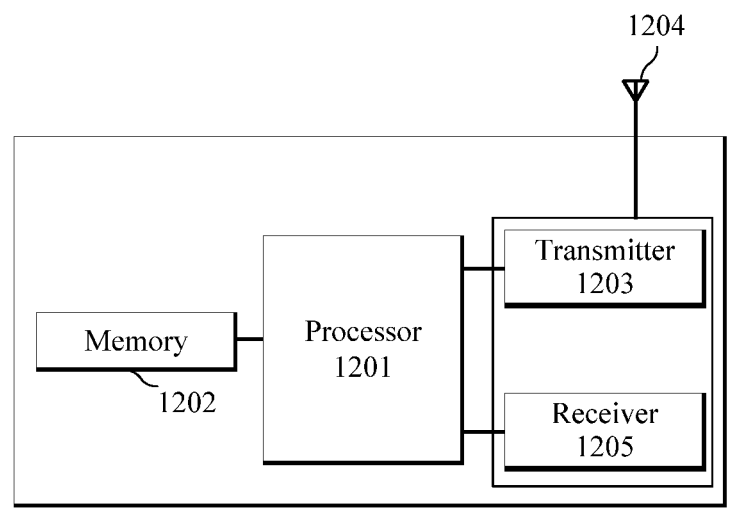
FIG. 12 is a schematic block diagram of an access point according to another embodiment of the present invention.

FIG. 12 is a schematic block diagram of an access point according to another embodiment of the present invention. The access point includes a processor 1201, a memory 1202, a transmitter 1203, and a receiver 1205. The components in the terminal are connected in a coupling manner. The receiver 1205 receives data by using an antenna 1204, and the transmitter 1203 sends data by using the antenna 1204. It should be noted that the receiver and the transmitter can share an antenna having two types of capabilities signal receiving and signal transmitting, or may use different antennas. This is not limited in this embodiment of the present invention, and the former case is merely used as an example.

The disclosed association establishment method in a wireless local area network in the embodiments of the present invention may be applied to the processor 1201, or be implemented by the processor 1201. The processor 1201 may be an integrated circuit chip with a signal processing capability. In an implementation process, the steps of the methods may be implemented by an integrated logical circuit of hardware in the processor 1201, or by using a software instruction. The processor 1201 may be a general purpose processor, a system on chip (SOC, SOC chip), a baseband processor, a digital signal processor (DSP), an application-specific integrated circuit (ASIC), a field programmable gate array (FPGA) or another programmable logical device, a discrete gate or transistor logical device, or a discrete hardware component, and can implement or execute the methods, steps and logical block diagrams disclosed in the embodiments of the present invention. The general purpose processor may be a microprocessor, or the processor may be any conventional processor or the like. The steps of the methods disclosed with reference to the embodiments of the present invention may be directly implemented by a hardware decoding processor, or may be implemented by a combination of hardware and software modules in a decoding processor. The software module may be located in a storage medium that is mature in the art, such as a random access memory (RAM), a flash memory, a read-only memory (ROM), a programmable read-only memory, an electrically erasable programmable memory, or a register. The storage medium is located in the memory 1202. The processor 1201 reads an instruction from the memory 1202 and completes the steps of the foregoing methods in combination with hardware of the processor 1201.

The processor 1201 is configured to generate pre-association index information related to a terminal, where the pre-association index information is used by the access point to identify the terminal when no association has been established between the terminal and the access point.

The transmitter 1203 is configured to send the pre-association index information to the terminal.

The receiver 1205 is configured to receive encrypted capability information of the terminal and an association request message that are sent by the terminal, where the association request message includes the pre-association index information.

The processor 1201 is configured to decrypt the encrypted capability information of the terminal.

The sending module 1203 is further configured to send an association response message to the terminal according to capability information of the terminal and the pre-association index information, so that the access point establishes an association with the terminal.

The access point in this embodiment of the present invention supports transmitting, with the terminal, the encrypted capability information of the terminal and identifies the terminal by using the pre-association index information, so that an eavesdropper cannot obtain the capability information of the terminal even though the capability information is detected by listening over an air interface before or during association establishment. This can prevent the eavesdropper from determining a location, time, and other information of the terminal according to the capability information of the terminal, and avoid user privacy leakage.

Optionally, in some embodiments, the receiver is specifically configured to receive an association request message sent by the terminal, where the association request message includes the encrypted capability information of the terminal.

Optionally, in some embodiments, the receiver is further configured to receive a first message sent by the terminal, where the first message includes the encrypted capability information of the terminal, and the first message is a management message, and receive the association request message sent by the terminal.

Optionally, in some embodiments, the receiver is further configured to receive a public key that is of the terminal and that is sent by the terminal.

The processor is further configured to generate a decryption key according to the public key of the terminal, where the decryption key is used for decrypting the encrypted capability information of the terminal.

The transmitter is further configured to send a public key of the access point to the terminal, where the public key of the access point is used by the terminal to generate an encryption key for encrypting the capability information of the terminal.

Optionally, in some embodiments, the receiver is specifically configured to receive a probe request message sent by the terminal, where the probe request message includes the public key of the terminal, or receive a second message sent by the terminal to the access point, where the second message includes the public key of the terminal, and the second message is a management message.

Optionally, in some embodiments, the transmitter is specifically configured to send a probe response message to the terminal, where the probe response message includes the public key of the access point, or send a third message to the terminal, where the third message includes the public key of the access point, and the third message is a management message, or send a beacon frame to the terminal, where the beacon frame includes the public key of the access point.

Optionally, in some embodiments, the transmitter is specifically configured to send indication information to the terminal, where the indication information is used to indicate that the access point supports transmitting, with the terminal, encrypted device capability information of the terminal.

Optionally, in some embodiments, the transmitter is further configured to send the probe response message to the terminal, where the probe response message includes the indication information, or send a fourth message to the terminal, where the fourth message includes the indication information, and the fourth message is a management message, or send a beacon frame to the terminal, where the beacon frame includes the indication information.

Optionally, in some embodiments, the transmitter is specifically configured to send a fifth message to the terminal, where the fifth message includes the pre-association index information, and the fifth message is a management message, or send the probe response message to the terminal, where the probe response message includes the pre-association index information.

Optionally, in some embodiments, the processor is further configured to generate, by the access point, encrypted capability information of the access point.

The sending module is further configured to send the encrypted capability information of the access point to the terminal.

It should be understood that the access point may be configured to perform various processes and/or steps corresponding to the access point in the foregoing method embodiments. To avoid repetition, details are not described herein again.

Figure 13:
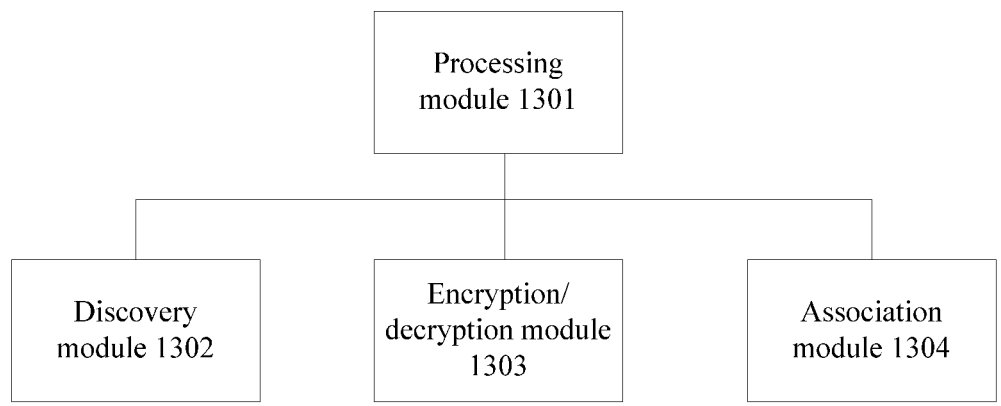
FIG. 13 is a schematic block diagram of a terminal according to still another embodiment of the present invention.

FIG. 13 is a schematic block diagram of a terminal according to still another embodiment of the present invention. The terminal includes a processing module 1301, a discovery module 1302, an encryption/decryption module 1303, and an association module 1304.

The processing module 1301 is configured to control an operation of each module inside the terminal.

The discovery module 1302 is configured to discover an access point.

Specifically, the discovery module is configured to discover a nearby access point supporting a security association mode, and/or generate a probe request message.

The encryption/decryption module 1303 is configured to generate a public/private key pair for protecting capability information of the terminal.

Optionally, in some embodiments, the encryption/decryption module may further generate an encryption key, and perform encryption and decryption processing on the capability information of the terminal.

Optionally, in some embodiments, the encryption/decryption module may further obtain, by means of calculation, an encryption key for the capability information of the terminal after obtaining a public key of the access point.

Optionally, in some embodiments, the encryption/decryption module may further encrypt the capability information of the terminal to generate encrypted capability information of the terminal.

Optionally, in some embodiments, when the access point also requires privacy protection, after receiving capability information that is of the access point and that is encrypted by the access point, the encryption/decryption module may further perform decryption to obtain the capability information of the access point.

The association module 1304 is configured to perform authentication and association between the terminal and the access point, including authentication and association of the terminal according to pre-association index information.

It should be understood that the terminal may be configured to perform various processes and/or steps corresponding to the terminal in the foregoing method embodiments. To avoid repetition, details are not described herein again.

Figure 14:
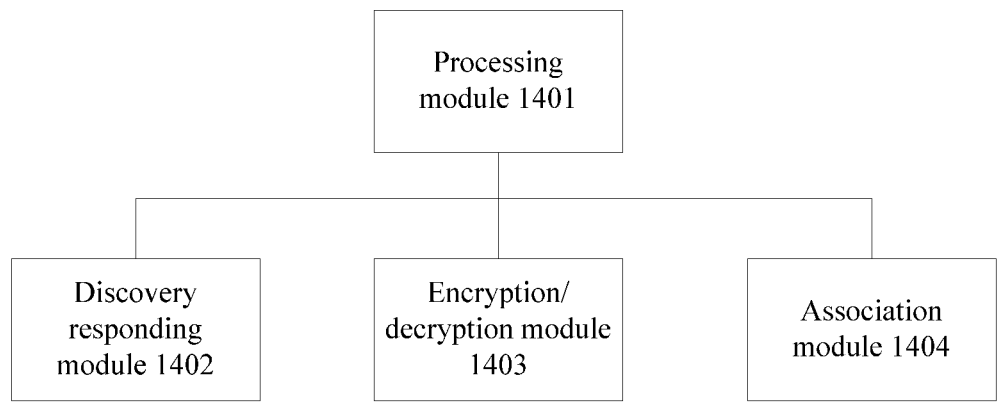
FIG. 14 is a schematic block diagram of an access point according to still another embodiment of the present invention.

FIG. 14 is a schematic block diagram of an access point according to still another embodiment of the present invention. The access point includes a processing module 1401, a discovery responding module 1402, an encryption/decryption module 1403, and an association module 1404.

The processing module 1401 is configured to control an operation of each module inside the access point. The discovery responding module 1402 is configured to generate and reply with a terminal discovery response.

Optionally, in some embodiments, the discovery responding module is further configured to generate a probe response message. Supporting a reverse tracking mode by the access point may also be indicated by using a response sent by the discovery responding module to a terminal.

The encryption/decryption module 1403 is configured to generate a public/private key pair for protecting capability information of the access point.

Optionally, in some embodiments, the encryption/decryption module may further generate an encryption key.

Optionally, in some embodiments, the encryption/decryption module may further perform encryption and decryption processing on the capability information of the access point.

Optionally, in some embodiments, the encryption/decryption module may further obtain, by means of calculation, an encryption key for the capability information of the access point after obtaining a public key of the terminal.

Optionally, in some embodiments, the encryption/decryption module may further decrypt encrypted capability information of the terminal to obtain capability information of the terminal.

Optionally, in some embodiments, when the access point also requires privacy protection, the encryption/decryption module may further encrypt device capability information, to generate encrypted capability information of the access point.

Optionally, in some embodiments, the encryption/decryption module may further generate pre-association index information.

The association module 1404 is configured to perform authentication and association of the terminal, including authentication and association with the terminal according to the pre-association index information.

The access point may be configured to perform various processes and/or steps corresponding to the access point in the foregoing method embodiments. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation falls beyond the scope of the technical solutions in the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again. Related parts of the method embodiments of the present invention may be mutually referenced. The apparatuses provided in the apparatus embodiments are configured to execute the methods provided in the corresponding method embodiments. Therefore, for the apparatus embodiments, reference may be made to related parts in the related method embodiments of the present invention. All related parts of the embodiments of the present invention may be mutually referenced.

The structural diagram of the apparatus given in each apparatus embodiment of the present invention merely shows a simplified design of the corresponding apparatus. In an actual application, the apparatus may include any quantity of transmitters, receivers, transceivers, processors, memories, and so on, so as to implement the functions or operations executed by the apparatus in each apparatus embodiment of the present invention, and all apparatus capable of implementing this application fall within the protection scope of this application.

Names of messages/frames/instruction information, modules or units, and the like provided in the embodiments of the present invention are only examples, and other names may be used provided that functions of the messages/frames/instruction information, the modules or units, and the like are the same.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. According to such an understanding, the technical solutions in the embodiments of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal, comprising:
a processor; and
a non-transitory computer-readable storage medium storing a program to be executed by the processor, the program including instructions to:
generate an encryption key of the terminal according to a public key of an access point;
generate encrypted capability information of the terminal using the encryption key of the terminal;

send a public key of the terminal to the access point, wherein the public key of the terminal is used by the access point to generate a decryption key for decrypting the encrypted capability information of the terminal;

receive pre-association index information that is related to the terminal and that is sent by the access point, wherein the pre-association index information is used by the access point to identify the terminal when no association has been established between the terminal and the access point;

send the encrypted capability information of the terminal and an association request message to the access point, after sending the public key to the access point, wherein the association request message comprises the pre-association index information; and receive an association response message that is sent by the access point according to capability information of the terminal and the pre-association index information, so that the terminal establishes an association with the access point.

2. The terminal according to claim 1, wherein the instructions to send the encrypted capability information include instructions to:

send the association request message to the access point, wherein the association request message comprises the encrypted capability information of the terminal.

3. The terminal according to claim 1, wherein the instructions to send the encrypted capability information include instructions to:

send a first message to the access point, wherein the first message comprises the encrypted capability information of the terminal, and the first message is a management message; and send the association request message to the access point.

4. The terminal according to claim 1, wherein the terminal receives the pre-association index information that is related to the terminal and that is sent by the access point after the terminal sends the public key of the terminal to the access point;

wherein the program further includes instructions to receive, from the access point, the public key of the access point wherein the instructions to generate the encryption key of the terminal include instructions to generate the encryption key of the terminal according to the public key of the access point after receiving the public key of the access point.

5. The terminal according to claim 4, wherein the program further includes instructions to perform at least one of:

send a probe request message to the access point, wherein the probe request message comprises the public key of the terminal; or send a second message to the access point, wherein the second message comprises the public key of the terminal, and the second message is a management message.

6. The terminal according to claim 4, wherein the program further includes instructions to perform at least one of:

receive a probe response message sent by the access point, wherein the probe response message comprises the public key of the access point; or receive a third message sent by the access point, wherein the third message comprises the public key of the access point, and the third message is a management message; or receive a beacon frame sent by the access point, wherein the beacon frame comprises the public key of the access point.

7. The terminal according to claim 1, wherein the program further includes instructions to:

receive indication information sent by the access point, wherein the indication information indicates that the access point supports transmitting, with the terminal, encrypted device capability information of the terminal.

8. The terminal according to claim 7, wherein the program further includes instructions to perform at least one of:

receive a probe response message sent by the access point, wherein the probe response message comprises the indication information; or receive a fourth message sent by the access point, wherein the fourth message comprises the indication information, and the fourth message is a management message; or receive a beacon frame sent by the access point, wherein the beacon frame comprises the indication information.

9. The terminal according to claim 1, wherein the program further includes instructions to perform at least one of:

receive a fifth message sent by the access point, wherein the fifth message comprises the pre-association index information, and the fifth message is a management message; or receive a probe response message sent by the access point, wherein the probe response message comprises the pre-association index information.

10. The terminal according to claim 1, wherein a media access control (MAC) address used by the terminal to send the association request message to the access point is different from a MAC address used by the terminal before the terminal sends the association request message to the access point.

11. An access point, comprising:

a processor; and a non-transitory computer-readable storage medium storing a program to be executed by the processor, the program including instructions to:

generate pre-association index information related to a terminal, wherein the pre-association index information is used by the access point to identify the terminal when no association has been established between the terminal and the access point;

send a public key of the access point to the terminal, wherein the public key of the access point is used by the terminal to generate an encryption key for encrypting capability information of the terminal;

send the pre-association index information to the terminal;

receive encrypted capability information of the terminal and an association request message that are sent by the terminal, wherein the association request message comprises the pre-association index information;

receive a public key that is of the terminal and that is sent by the terminal;

generate a decryption key according to the public key of the terminal;

decrypt the encrypted capability information of the terminal according to the decryption key; and send an association response message to the terminal according to capability information of the terminal and the pre-association index information, so that the access point establishes an association with the terminal.

12. The access point according to claim 11, wherein the program further includes instructions to:
receive the association request message sent by the terminal, wherein the association request message comprises the encrypted capability information of the terminal.

13. The access point according to claim 11, wherein the program further includes instructions to:
receive a first message sent by the terminal, wherein the first message comprises the encrypted capability information of the terminal, and the first message is a management message; and
receive the association request message sent by the terminal.

14. The access point according to claim 11, wherein
the access point sends the pre-association index information to the terminal after the access point receives the public key that is of the terminal and that is sent by the terminal.

15. The access point according to claim 14, wherein the program further includes instructions to perform at least one of:
receive a probe request message sent by the terminal, wherein the probe request message comprises the public key of the terminal; or
receive a second message sent by the terminal, wherein the second message comprises the public key of the terminal, and the second message is a management message.

16. The access point according to claim 14, wherein the program further includes instructions to perform at least one of:
send a probe response message to the terminal, wherein the probe response message comprises the public key of the access point; or
send a third message to the terminal, wherein the third message comprises the public key of the access point, and the third message is a management message; or
send a beacon frame to the terminal, wherein the beacon frame comprises the public key of the access point.

17. The access point according to claim 11, wherein the program further includes instructions to:
send indication information to the terminal, wherein the indication information indicates that the access point supports transmitting, with the terminal, encrypted device capability information of the terminal.

18. The access point according to claim 17, wherein program further includes instructions to perform at least one of:
send a probe response message to the terminal, wherein the probe response message comprises the indication information; or
send a fourth message to the terminal, wherein the fourth message comprises the indication information, and the fourth message is a management message; or
send a beacon frame to the terminal, wherein the beacon frame comprises the indication information.

19. The access point according to claim 11, wherein the program further includes instructions to perform at least one of:
send a fifth message to the terminal, wherein the fifth message comprises the pre-association index information, and the fifth message is a management message; or
send a probe response message to the terminal, wherein the probe response message comprises the pre-association index information.

20. The access point according to claim 11, wherein the program further includes instructions to:
generate encrypted capability information of the access point before receiving the association request message sent by the terminal; and
send the encrypted capability information of the access point to the terminal.

* * * * *